United States Patent
Zhang et al.

(10) Patent No.: US 9,331,986 B2
(45) Date of Patent: May 3, 2016

(54) ENCRYPTION COMMUNICATION METHOD, APPARATUS AND SYSTEM

(71) Applicant: Huawei Technologies Co., Ltd., Shenzhen (CN)

(72) Inventors: Yongjing Zhang, Shenzhen (CN); Yonggang Bian, Shenzhen (CN); Cheng Huang, Shenzhen (CN); Chuansuo Ding, Shenzhen (CN); Lunjian Mu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 13/656,362

(22) Filed: Oct. 19, 2012

(65) Prior Publication Data

US 2013/0061037 A1     Mar. 7, 2013

Related U.S. Application Data

(63) Continuation of application No. PCT/CN2011/072591, filed on Apr. 11, 2011.

(30) Foreign Application Priority Data

Apr. 21, 2010  (CN) .......................... 2010 1 0158688

(51) Int. Cl.
*H04L 29/06* (2006.01)
*H04W 4/00* (2009.01)
*H04W 12/02* (2009.01)

(52) U.S. Cl.
CPC ........... *H04L 63/0435* (2013.01); *H04W 4/005* (2013.01); *H04W 12/02* (2013.01)

(58) Field of Classification Search
CPC ............................. H04L 9/08; H04L 9/0802
USPC .................................. 713/164–19, 164–196
See application file for complete search history.

(56) References Cited

U.S. PATENT DOCUMENTS

| 2003/0126434 | A1* | 7/2003 | Lim .................... G06F 21/6218 713/164 |
| 2003/0221098 | A1 | 11/2003 | Chen et al. |

(Continued)

FOREIGN PATENT DOCUMENTS

| CN | 1617494 A | 5/2005 |
| CN | 1747381 A | 3/2006 |

(Continued)

OTHER PUBLICATIONS

Agrawal et al., "Operator-based over-the-air M2M wireless sensor network security," Intelligence in Next Generation Networks (ICIN), 2010 14th International Conference on Year: 2010 pp. 1-5.*

(Continued)

*Primary Examiner* — Roderick Tolentino
(74) *Attorney, Agent, or Firm* — Brinks Gilson & Lione

(57) ABSTRACT

An encrypted communication method relating to communication technologies includes allocating a same encryption key for a first application and a terminal that is only bound to the first application. The method also includes transparently transmitting information communicated between the terminal and the first application when determining that the terminal communicates with the first application by using the same encryption key.

17 Claims, 10 Drawing Sheets

(56) References Cited

U.S. PATENT DOCUMENTS

| | | | | |
|---|---|---|---|---|
| 2005/0235152 | A1* | 10/2005 | Ozaki | H04L 9/0891 713/170 |
| 2006/0053289 | A1 | 3/2006 | Singh | |
| 2006/0277406 | A1* | 12/2006 | Hashimoto | H04L 63/029 713/168 |
| 2007/0168662 | A1* | 7/2007 | Escott | H04L 63/0414 713/168 |
| 2008/0235508 | A1* | 9/2008 | Ran | H04L 63/0428 713/151 |
| 2009/0106551 | A1 | 4/2009 | Boren et al. | |
| 2009/0191857 | A1 | 7/2009 | Horn et al. | |
| 2010/0174907 | A1* | 7/2010 | Semple | H04L 63/0853 713/169 |
| 2011/0055561 | A1* | 3/2011 | Lai | H04L 9/083 713/168 |
| 2011/0107082 | A1* | 5/2011 | Blom | H04L 63/168 713/150 |
| 2011/0145910 | A1* | 6/2011 | Barnes | H04L 63/0263 726/12 |
| 2011/0252235 | A1* | 10/2011 | Dolan | H04L 29/12801 713/168 |
| 2012/0302229 | A1* | 11/2012 | Ronneke | H04L 29/12754 455/422.1 |

FOREIGN PATENT DOCUMENTS

| | | |
|---|---|---|
| CN | 101136742 A | 3/2008 |
| CN | 101479984 A | 7/2009 |
| CN | 101500227 A | 8/2009 |
| CN | 101959189 A | 1/2011 |
| EP | 1764974 A1 | 3/2007 |
| WO | WO 02/44858 A2 | 6/2002 |
| WO | WO 2008/020015 A1 | 2/2008 |
| WO | 2009/095295 A1 | 8/2009 |

OTHER PUBLICATIONS

Jiang et al., "A study of information security for M2M of IOT," Advanced Computer Theory and Engineering (ICACTE), 2010 3rd International Conference on Year: 2010, vol. pp. V3-576-V3-579.*

Extended European Search Report issued in corresponding European Patent Application No. 11771546.6, mailed Aug. 27, 2013, 16 pages.

International Search Report issued in corresponding PCT Application No. PCT/CN2011/072591; mailed Jul. 21, 2011.

Office Action issued in corresponding Chinese Patent Application No. 201010158688.8, mailed May 10, 2013, 34 pages.

Written Opinion of the International Searching Authority issued in corresponding PCT Patent Application No. PCT/CN2011/072591, mailed Jul. 21, 2011.

* cited by examiner

ENCRYPTION COMMUNICATION METHOD, APPARATUS AND SYSTEM

CROSS-REFERENCE TO RELATED APPLICATIONS

This application is a continuation of International Application No. PCT/CN2011/072591, filed on Apr. 11, 2011, which claims priority to Chinese Patent Application No. 201010158688.8, filed on Apr. 21, 2010, both of which are hereby incorporated by reference in their entireties.

FIELD OF APPLICATION

The present application relates to communication technologies, and particularly, to an encrypted communication method, apparatus and system.

BACKGROUND OF THE APPLICATION

M2M (Machine-to-Machine Communications, Machine-to-Machine Communications) is a networking application and service which takes machinery intelligent interaction as the core. FIG. 1 is a typical M2M system architecture, in which various M2M terminals are connected to an M2M service platform directly or through an M2M gateway, while various M2M applications (such as, electric meter reading, intelligent transportation, etc.), obtain, through an M2M service platform, data collected by an M2M terminal, or obtain, through which an M2M service platform controls a M2M terminal, data collected.

Since the data interacted between a M2M application and a M2M terminal always has high commercial value or sensibility, the M2M system needs to have an ability of supporting the encrypted data transmission to avoid the useful data information being leaked to any malicious third party. Also, in order to meet the supervisory requirement of the state security Authority and the relevant Regulation Institutions, the M2M service platform is required to be capable of knowing the corresponding communication encryption key, and decrypting and acquiring, under the authorization of the relevant Regulation Institutions, the data content transmitted between a M2M terminal and a M2M application. Therefore, the M2M service platform can be used as KDC (Key Distribution Center, Key Distribution Center) to distribute a communication encryption key to a M2M terminal and to a M2M application respectively, and to store the encryption key for lawful interception.

The inventor has found at least the following problems in the prior art during the implementation of the disclosed embodiments: In practical deployment, if the same communication encryption key is simply distributed to all M2M applications and M2M terminals, because it can not be assured that different M2M applications are isolated form each other, the communication encryption key may be obtained easily, and the security of communication data can not be guaranteed.

However, if the M2M service platform distributes different communication encryption keys to all M2M applications and M2M terminals respectively and takes charge of decryption and re-encryption processing during the process of data content forwarding, the processing load of the M2M service platform is higher when the volume of the M2M terminals and the M2M applications is larger, which requires the M2M service platform to have higher processing performance.

In addition, if the M2M service platform distributes the same communication encryption key to the M2M terminal and the M2M application which effect service communication with each other and forwards the data content through transparent transmission, the M2M terminal needs to effect encryption-transmission and reception-decryption one by one with different communication encryption key when one M2M terminal effect service communications with a plurality of M2M applications. However, the M2M terminals are usually some sensors or microcontrollers which have lower processing capability and limited power supply, thereby they can not support the encryption processing logic of large volume operations and complicated message transceiving mechanism.

SUMMARY OF THE APPLICATION

Embodiments below provide an encrypted communication method, apparatus and system which can reduce the processing load of devices in a M2M system on the premise that the data security can be guaranteed.

In view of the above objective, the embodiments adopt the following technical solutions:

An encrypted communication method, comprising:
allocating a same encryption key for a first application and a terminal which is only bound to the first application;
transparently transmitting the information interacted between the terminal and the first application when determining that the terminal communicates with the first application by using the same encryption key.

An encrypted communication apparatus, comprising:
a key allocating unit, configured to allocate a same encryption key for a first application and a terminal which is only bound to the first application;
a key storing unit, configured to store the encryption key which is allocated for the terminal or the first application by the key allocating unit;
an encrypted communication unit, configured to transparently transmit information interacted between the terminal and the first application, when determining that the terminal communicates with the first application by using the same encryption key according to the encryption key stored in the key storing unit.

An encrypted communication system, comprising a terminal, a service platform and a first application;
the service platform is configured to allocate a same encryption key for the first application and the terminal which is only bound to the first application and, when determining that the terminal communicates with the first application by using the same encryption key, transparently transmit the information interacted between the terminal and the first application;
the terminal is configured to obtain the encryption key allocated by the service platform and to encrypt or decrypt information interacted with the first application according to the obtained encryption key;
the first application is configured to obtain the encryption key allocated by the service platform and to encrypt or decrypt the information interacted with the terminal according to the obtained encryption key.

The encrypted communication method, apparatus and system in the embodiments, by allocating a same encryption key for a first application and a terminal which is only bound to the first application and transparently transmitting the information interacted between the terminal and the first application and encrypted by the same encryption key when the terminal and the first application communicate with each other by using the allocated same encryption key, can reduce the decryption and re-encryption processing of the service platform during the process of the information forwarding, and thus reduce the processing load of the service platform. Also, the terminal only needs to use a single encryption key to perform the encryption and decryption processing when sending and receiving service messages. It reduces the processing load of the terminal with both limited processing capability and power supply. Accordingly, the processing load of devices in the M2M system can be reduced and the service processing performance of the M2M system can be improved on the premise that the data security is guaranteed.

BRIEF DESCRIPTION OF THE DRAWINGS

To illustrate the technical solution in the embodiments more clearly, a brief introduction on the accompanying drawings which are needed in the description of the embodiments is given below. Apparently, the accompanying drawings in the description below are merely some embodiments, based on which other drawings can be acquired by those skilled in the art without any inventive effort.

EMBODIMENTS OF THE APPLICATION

The technical solutions in the embodiments are hereinafter described clearly and completely with reference to the accompanying drawings in the embodiments. The described embodiments are merely part, but not all, of the embodiments. All of the other embodiments that are acquired by those skilled in the art based on the embodiments without any inventive efforts fall into the scope of the claims.

Figure 1:
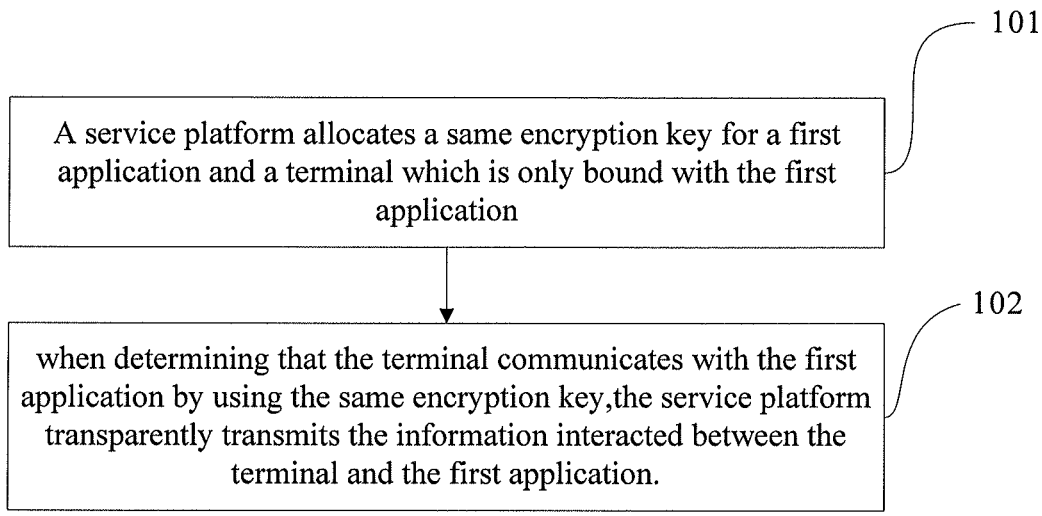
FIG. 1 is a schematic flowchart of an encrypted communication method provided in an embodiment.

In order to reduce the processing load of devices in a M2M system on the premise that the data security is guaranteed, an embodiment provides an encrypted communication method. As shown in FIG. 1, the method comprises:

101, a service platform allocates a same encryption key for a first application and a terminal which is only bound to the first application;

In the present step 101, an encryption key may be allocated separately for a terminal which is bound to a plurality of applications or which is not bound to any application; or, an encryption key may be allocated separately for the first application when determining that the terminal which is only bound to the first application does not exist.

In the embodiments, an application means a device that obtains data collected by a terminal or that controls a terminal. And, the binding relationship between a terminal and an application usually means a relatively stable subscription binding relationship during a specific time period. For example, a M2M service communication relationship between a specific M2M terminal and a specific M2M application is configured in a subscription database of an operator in an M2M system when a M2M service is subscribed and activated. And, subscription information of a terminal or subscription information of an application may be modified or changed in a later certain time, thus causing a change of the binding relationship.

In the present step, an encryption key may be allocated according to any one of at least four following modes.

Figure 2:
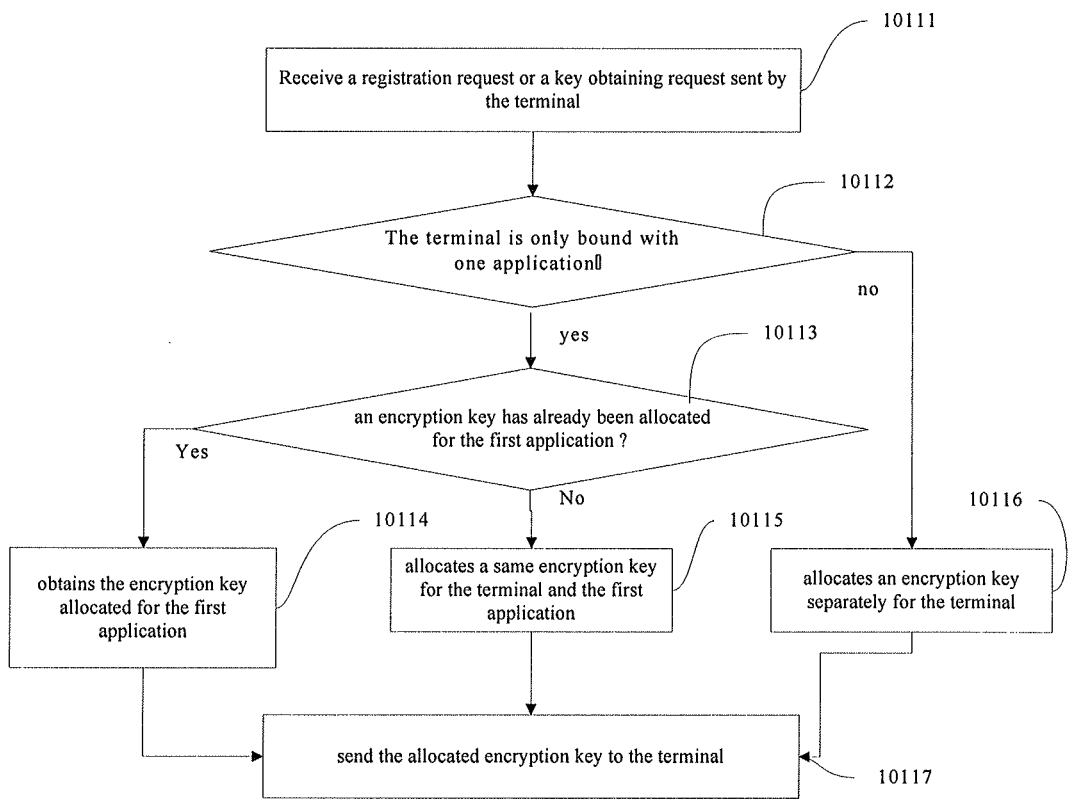
FIG. 2 is a schematic flowchart of an encryption key allocation method provided in an embodiment.

Mode 1:

As shown in FIG. 2, an allocation method of an encryption key comprises:

10111, a service platform receives a registration request or a key obtaining request sent by a terminal;

10112, the service platform obtains a binding relationship of the terminal according to the registration request or the key obtaining request, and judges whether the terminal is only bound to one application according to the binding relationship of the terminal;

Specifically, the service platform may obtain an identifier of the terminal from the registration request or the key obtaining request, and query subscription configuration information of the terminal from a database according to the identifier of the terminal, and obtain the binding relationship of the terminal according to the subscription configuration information. Or, the service platform may also obtain related indication information from the registration request or the key obtaining request and obtain the binding relationship of the terminal according to the indication information. For example, the related indication information may be an application identifier list which has a binding relationship with the terminal.

After the binding relationship of the terminal is obtained, according to the binding relationship, the service platform determines that whether the terminal has a binding relationship with only one application, namely that the terminal only communicates with a certain application and does not communicate with other applications. If it is determined that the terminal is only bound to one application, the application is the first application and the method proceeds to the step 10113. Otherwise, if it is determined that the terminal has a binding relationship with a plurality of applications or does not have a binding relationship with any application, the method jumps to the step 10116.

10113, the service platform judges whether an encryption key has already been allocated for the first application.

For example, the service platform queries whether an encryption key has already been allocated for the first application from the database according to the identifier of the first application. If yes, the method proceeds to the step 10114; otherwise, the method jumps to the step 10115.

10114, the service platform obtains the encryption key which has already been allocated for the first application, and allocates the encryption key which has already been allocated for the first application for the terminal, and then the method jumps to the step 10117;

10115, the service platform generates a new encryption key, and stores the encryption key new generated as the encryption key allocated for the first application and the terminal, and then the method jumps to the step 10117.

10116, the service platform separately allocates a new encryption key for the terminal, namely generates a new encryption key and stores the encryption key new generated as the encryption key allocated for the terminal, and then the method jumps to the step 10117.

10117, the service platform sends the encryption key allocated for the terminal to the terminal.

Mode 2

Figure 3:
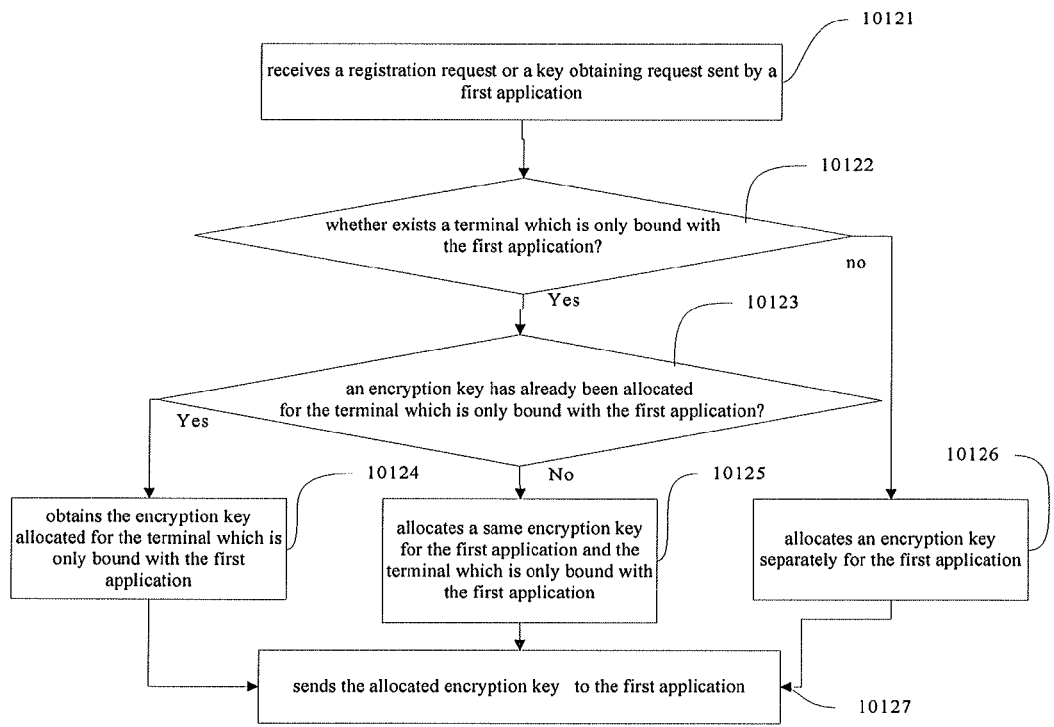
FIG. 3 is a schematic flowchart of another encryption key allocation method provided in an embodiment of the present.

As shown in FIG. 3, an allocation method of an encryption key comprises:

10121, a service platform receives a registration request or a key obtaining request sent by a first application;

10122, the service platform obtains the binding relationship of the first application according to the registration request or the key obtaining request, and judges whether exists a terminal which is only bound to the first application according to the binding relationship of the first application.

Specifically, the service platform obtains the identifier of the first application from the registration request or the key obtaining request, and queries subscription configuration information of the first application from the database according to the identifier of the first application, and obtains the binding relationship of the first application according to the subscription configuration information, wherein the binding relationship comprises the information of the terminal which is only bound to the first application. Or, the service platform obtains related indication information, for example, a terminal identifier list which has a binding relationship only with the first application, from the registration request or the key obtaining request, and obtains the binding relationship of the first application according to the indication information. The binding relationship of the first application comprises the information of the terminal which is only bound to the first application.

It is determined whether there exists the terminal which is only bound to the first application according to the information of the terminal which is only bound to the first application, namely whether exists at least one terminal which only communicates with the first application and does not communicate with other applications. If yes, the method proceeds to the step 10123; otherwise, the method jumps to the step 10126.

10123, the service platform judges whether an encryption key has been allocated for these terminals which are only bound to the first application.

For example, the service platform may query whether an encryption key has already been allocated for these terminals which are only bound to the first application according to the identifiers of these terminals. If yes, the method proceeds to the step 10124; otherwise, the method jumps to the step 10125.

10124, the service platform obtains the encryption key which has already been allocated for these terminals, and allocates the encryption key which has already been allocated for the terminals for the first application, and then the method jumps to the step 10127.

10125, the service platform generates a new encryption key, and stores the encryption key new generated as the encryption key allocated for the first application and these terminals, and then the method jumps to the step 10127.

10126, the service platform separately allocates a new encryption key for the first application, namely generates a new encryption key and stores the encryption key new generated as the encryption key allocated for the first application.

10127, the service platform sends the encryption key allocated for the first application to the first application.

Mode 3

Figure 4:
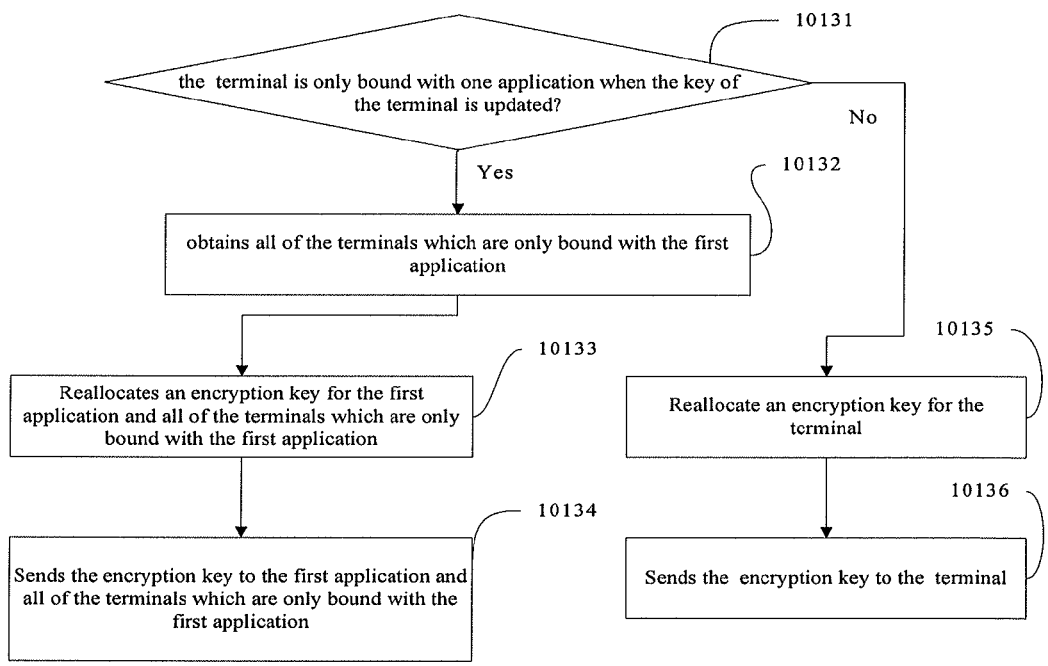
FIG. 4 is a schematic flowchart of another encryption key allocation method provided in an embodiment of the present.

As shown in FIG. 4, an allocation method of an encryption key comprises:

10131, upon receiving a key updating request of a first terminal or triggering an updating of setting rules of a first terminal, the service platform obtains the binding relationship of the first terminal, and judges whether the terminal is only bound to one application according to the binding relationship of the first terminal;

Specifically, the service platform may receive the key updating request of the first terminal from the first terminal, and update the key according to the key updating request. Or, the service platform may trigger an updating of the first terminal according to a preset updating setting rule. For example, the updating may be triggered periodically based on the time, or be triggered when the data volume interacted between the first terminal and the service platform reaches a certain threshold, or be triggered because of a specific security event (for example, system intrusion detection), and so on.

Upon receiving the key updating request of the first terminal, the service platform may obtain an identifier of the first terminal from the key updating request, query subscription configuration information of the first terminal from the database according to the identifier of the first terminal, and obtain a binding relationship of the first terminal according to the subscription configuration information. Or, upon receiving the key updating request of the first terminal, the service platform may also obtain related indication information, for example, an application identifier list which has a binding relationship with the first terminal, from the key updating request, and obtain the binding relationship of the first terminal according to the indication information. Or, upon triggering an updating of setting rules of the first terminal, the service platform obtains the identifier of the first terminal, queries the subscription configuration information of the first terminal from the database according to the identifier of the first terminal, and obtains the binding relationship of the first terminal according to the subscription configuration information.

After the binding relationship of the first terminal is obtained, it is judged whether the first terminal is only bound to one application, namely whether the terminal only communicates with a certain application and does not communicate with other applications. If it is determined that the first terminal is only bound to one application, the application is the first application, and then the method proceeds to the step 10132. Otherwise, if it is determined that the first terminal has a binding relationship with a plurality of applications or does not has a binding relationship with any application, the method jumps to the step 10135.

10132, the service platform obtains all of the terminals which are only bound to the first application.

For example, the service platform obtains the identifier of the first application, and queries the subscription configuration information according to the identifier of the first application, and obtains the identifiers of all of the terminals which are only bound to the first application, and then the method jumps to the step 10133.

10133, the service platform generates a new encryption key, and stores the encryption key new generated as the encryption key allocated for the first application and all of the terminals which are only bound to the first application, and then the method proceeds to the step 10134.

10134, the service platform sends the allocated encryption key to the first application and all of the terminals which are only bound to the first application.

10135, the service platform allocates a new encryption key separately for the first terminal, namely generates a new encryption key and stores the encryption key new generated as the encryption key allocated for the first terminal, and then the method proceeds to the step 10136.

10136, the service platform sends the allocated encryption key to the first terminal.

Mode 4

Figure 5:
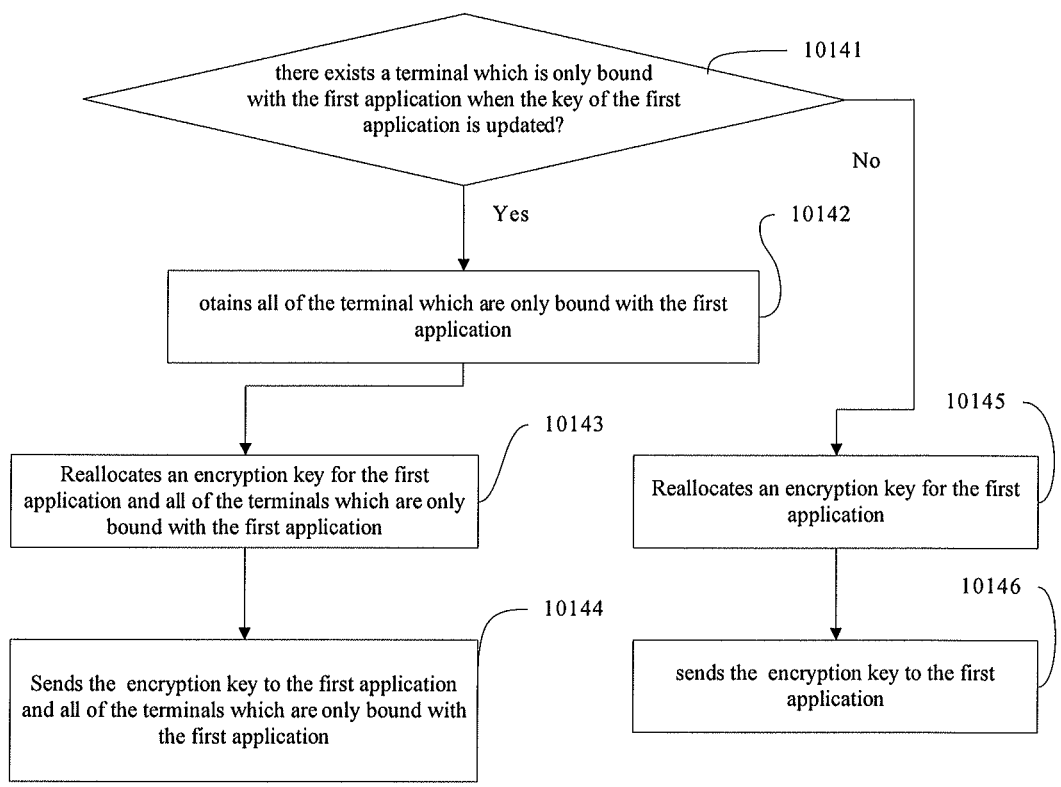
FIG. 5 is a schematic flowchart of another encryption key allocation method provided in an embodiment of the present.

As shown in FIG. 5, an allocation method of an encryption key comprises:

10141, upon receiving a key updating request of a first application or triggering an updating setting rule of the first application, the service platform obtains a binding relationship of the first application, and judges whether there exists a terminal which is only bound to the first application according to the binding relationship of the first application;

Specifically, the service platform may receive the key updating request from the first application, and update the encryption key according to the encryption key updating request. Or, the service platform may trigger the updating of the first application according to the preset updating setting rule. For example, the updating may be periodically triggered based on time, or be triggered when the data volume interacted between the first terminal and the service platform reaches a certain threshold, or be triggered because of a specific security event (for example, system intrusion detection), and so on.

Upon receiving the key updating request of the first application, the service platform may obtain an identifier of the first application from the key updating request of the first application, query subscription configuration information of the first application from a database according to the identifier of the first application, and obtain the binding relationship of the first application according to the subscription configuration information, wherein the binding relationship comprises the information of the terminal which is only bound to first application. Or, upon receiving the key updating request of the first application, the service platform may obtain related indication information, such as, a terminal identifier list which only has a binding relationship with the first application, from the key updating request of the first application, and obtain the binding relationship of the first application according to the indication information, wherein the binding relationship of the first application comprises information of the terminal which is only bound to the first application. Or, upon triggering the updating setting rule of the first application, the service platform obtains the identifier of the first application, queries the subscription configuration information of the first application from the database according to the identifier of the first application, and obtains the binding relationship of the first terminal according to the subscription configuration information, wherein the binding relationship of the first application comprises the information of the terminal which is only bound to the first application.

According to the information of the terminal which is only bound to the first application, it is judged whether there exists a terminal which is only bound to the first application, namely that whether there exists at least one terminal which only communicates with the first application and does not communicate with other applications. If it is determined that there exists a terminal which is only bound to the first application, the step 10142 is performed; otherwise, the step 10144 is performed.

10142, the service platform generates a new encryption key and stores the encryption key new generated as the encryption key allocated for the first application and all of the terminals which are only bound to the first application, and then the step 10143 is performed.

10143, the service platform sends the allocated encryption key to the first application and all of the terminals which are only bound to the first application.

10144, the service platform allocates a new encryption key separately for the first application, namely generates a new encryption key, and stores the encryption key new generated as the encryption key allocated for the first application, and then the method proceeds to the step 10145.

10145, the service platform sends the allocated encryption key to the first application.

In the embodiments, the service platform may r send of the encryption key through at least any one of following ways: a. to send the encryption key through a secure transmission channel which has already been established between the M2M service platform and the M2M terminals, such as a short message, Internet Protocol Security (Internet Protocol Security, IPSec), a Transport Layer Security (Transport Layer Security, TLS); b. to send the encryption key which has encrypted through a pre-configured key (such as, an asymmetrical common key of the M2M terminals, a symmetrical key shared between the M2M service platform and the M2M terminals); c, to send the encryption key through other security terminal configuration technologies, such as, Device Management (Device Management, DM) and Client Provisioning (Client Provisioning, CP) defined by Open Mobile Alliance (Open Mobile Alliance, OMA), and so on.

102, when determining that the terminal communicates with the first application by using the same encryption key, the service platform transparently transmits the information interacted between the terminal and the first application.

For example, after allocating an encryption key for the terminal and the application which are connected with the service platform, and upon receiving communication information sent by a certain terminal, the service platform may determine the binding relationship of the terminal. Since when the terminal is only bound to one application, the terminal communicates with the bound application by using the same encryption key, the service platform does not perform the decryption or re-encryption processing to the communication information and transparently transmits the information to the corresponding application. Upon receiving communication information of a certain application, the service platform may determine the binding relationship of the terminal which is a destination of sending information of the application. Since the terminal communicates with the application by using the same encryption key when the terminal is only bound to the application, the service platform does not perform the decryption or re-encryption processing to the communication information, and directly and transparently transmits the information to the terminal.

In addition, since the M2M terminals per se are some simple sensor devices with very limited processing capability and network connection capability, in many cases, the M2M terminals need to be connected to the M2M service platform through a M2M gateway which is needed to be acted as the agent of the M2M terminals to process the encryption and decryption of the communication content. At this time, the M2M service platform may make the M2M gateway as a M2M terminal and distribute and update encryption key for the M2M gateway. To be specific, when a plurality of M2M terminals are connected to the M2M service platform through a common M2M gateway, if the plurality of M2M terminal are all bound to the same M2M application, the M2M gateway is regarded as the M2M terminal which only has a binding relationship with the M2M application; otherwise, the M2M gateway is regarded as the M2M terminal which does not has a binding relationship with any application. In order to express simply, in the embodiments, the terminals all comprise the meanings of aforesaid gateway.

The encrypted communication method in the embodiments, through allocating the same encryption key for a first application and a terminal which is only bound to the first application and transparently transmitting the information interacted between the terminal and the first application and encrypted by the same encryption key when the terminal and the first application communicate with each other by using the allocated same encryption key, can reduce the decryption and re-encryption processing of the service platform during the process of the information transmission, and thus reduce the processing load of the service platform, and also reduce the processing load of the terminal with limited processing capability and power supply since the terminal also only needs to use a single encryption key to perform the encryption and decryption processing when sending or receiving service message. Accordingly, the encrypted communication method in the embodiments can reduce the processing load of devices in the M2M system and improve the service processing performance of the M2M system on the premise that the data security can be guaranteed.

In the aforesaid embodiments, the encryption key may be allocated when the terminal or the application is registered or may be allocated when the updating of the terminal or the application is triggered. The embodiments are further explained as follows with reference to the aforesaid different cases.

Embodiment 1

Figure 6:
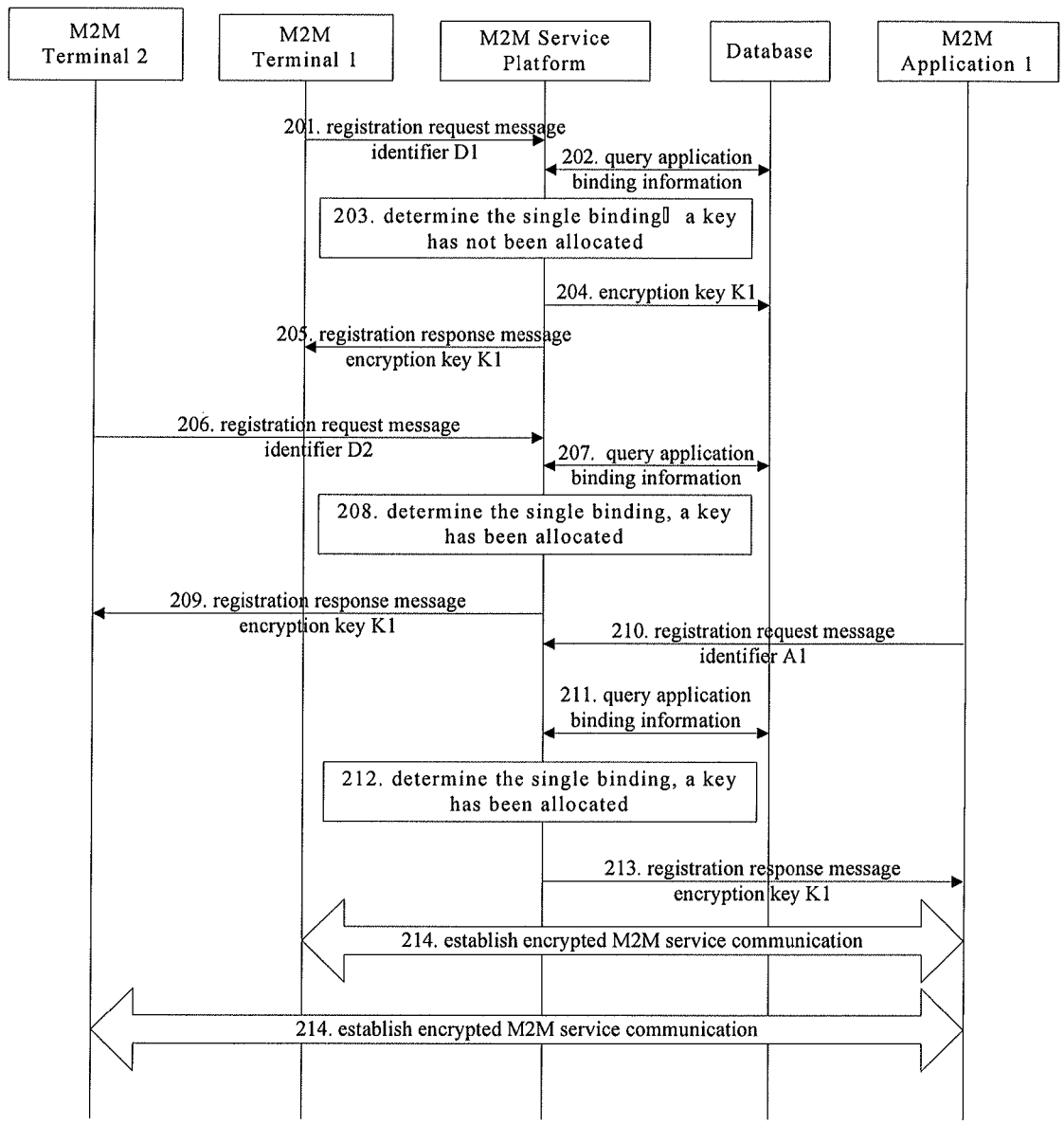
FIG. 6 is a schematic flowchart of another encrypted communication method provided in an embodiment.

In the present embodiment, it is assumed that when a M2M service is subscribed and activated, M2M terminals 1, 2 (such as, intelligent electric meter) are both only bound to an M2M application 1 (such as, electric meter reading system of a power supply company), and an encrypted communication way needs to be adopted between the M2M terminals 1, 2 and the M2M application 1, and communication configuration related data is stored in a subscription database of a M2M service operator (such as, Home Location Register (Home Location Register, HLR)). When the M2M terminals 1, 2 firstly register to the M2M service platform, and then the M2M application registers to the M2M service platform, as shown in FIG. 6, the method that the M2M service platform allocates an encryption key for the M2M terminals 1, 2 and the M2M application 1 comprises:

201, the M2M terminal 1 sends a registration request message to the M2M service platform, wherein the registration request message comprises the identifier D1 of the M2M terminal 1.

Optionally, the registration request message may further comprise indication information for requesting an encryption key.

202, the M2M service platform authenticates the M2M terminal 1 based on the identifier D1, and queries, after the authentication is passed, a local or remote subscription database to obtain subscription binding relationship information of the M2M terminal 1.

203, the M2M service platform determines, according to the obtained binding relationship information, that the M2M terminal 1 only has a binding relationship with the M2M application 1. And the M2M service platform determines an encryption key has not been allocated for the M2M application 1 yet;

204, the M2M service platform allocates a same encryption key K1 for the M2M terminal 1 and M2M application 1, and stores the encryption key K1 in the local or remote database;

205, the M2M service platform returns a registration response message to the M2M terminal 1, wherein the registration response message comprises the encryption key K1.

Optionally, in order to guarantee the security of the encryption key K1, the M2M service platform may perform encryption processing to the encryption key K1 by using a basic key pre-shared with the M2M terminal 1, and then send the encryption key K1 encrypted to the M2M terminal 1 through the registration response message. Or, other transmission technologies may be adopted to send the encryption key K1 to the M2M terminal 1.

206, the M2M terminal 2 sends a registration request message to the M2M service platform, wherein the registration request message comprises the identifier D2 of the M2M terminal 2.

Optionally, the registration request message may further comprise indication information for requesting an encryption key.

207, the M2M service platform authenticates the M2M terminal 2 according to the identifier D2, and queries, after the authentication is passed, the local or remote database to obtain the subscription binding relationship information of the M2M terminal 2.

208, according to the obtained binding relationship information, the M2M service platform determines that the M2M terminal 2 only has a binding relationship with the M2M application 1 and the encryption key K1 has already been allocated for the M2M application 1.

209, the M2M service platform returns a registration response message to the M2M terminal 2, wherein the registration response message comprises the encryption key K1.

Optionally, in order to guarantee the security of the encryption key K1, the M2M service platform may perform encryption processing to the encryption key K1 by using a basic key pre-shared with the M2M terminal 2, and then send the encryption key K1 encrypted to the M2M terminal 2 through the registration response message. Or, other transmission technologies may be adopted to send the encryption key K1 to the M2M terminal 2.

210, the M2M application 1 sends a registration request message to the M2M service platform, wherein the registration request message comprises an identifier A1 of the M2M application 1.

Optionally, the registration request message may further comprise indication information for requesting an encryption key.

211, the M2M service platform authenticates the M2M application 1 according to the identifier A1, and queries, after the authentication is passed, the local or remote subscription database to obtain a subscription binding relationship information of the M2M application 1;

212, according to the obtained binding relationship information, the M2M service platform determines that the M2M terminals 1, 2 only have a binding relationship with the M2M application 1, namely that there exists a M2M terminal which is only bound to the M2M application, and determines that the encryption key K1 has already been allocated for the M2M application 1 and the M2M terminals 1, 2;

213, the M2M service platform returns a registration response message to the M2M application 1, wherein the registration response message comprises the encryption key K1.

Optionally, in order to guarantee the security of the encryption key K1, the M2M platform may perform encryption processing to the encryption key K1 by using a basic key pre-shared with the M2M application 1, and then send the encryption key K1 encrypted to the M2M application 1 through the registration response message. Or, other transmission technologies may be adopted to send the encryption key K1 to the M2M application 1.

214, the M2M terminals 1, 2 and the M2M application 1 establish an encrypted unicast or multicast M2M service communication by using the encryption key K1 allocated by the M2M service platform. The M2M service platform may directly and transparently transmit the encrypted service message interacted between the M2M terminals 1, 2 and the M2M application 1, and need not to perform the operation of decryption and re-encryption when the information is forwarded.

Optionally, if the State Security Authority or the related Regulation Institutions need to lawfully monitor the M2M service communication between the M2M terminals 1,2 and the M2M application 1, the M2M service platform, by using the stored encryption key K1, may directly perform the operation of decryption or indicate other network entity to perform the operation of decryption.

Embodiment 2

Figure 7:
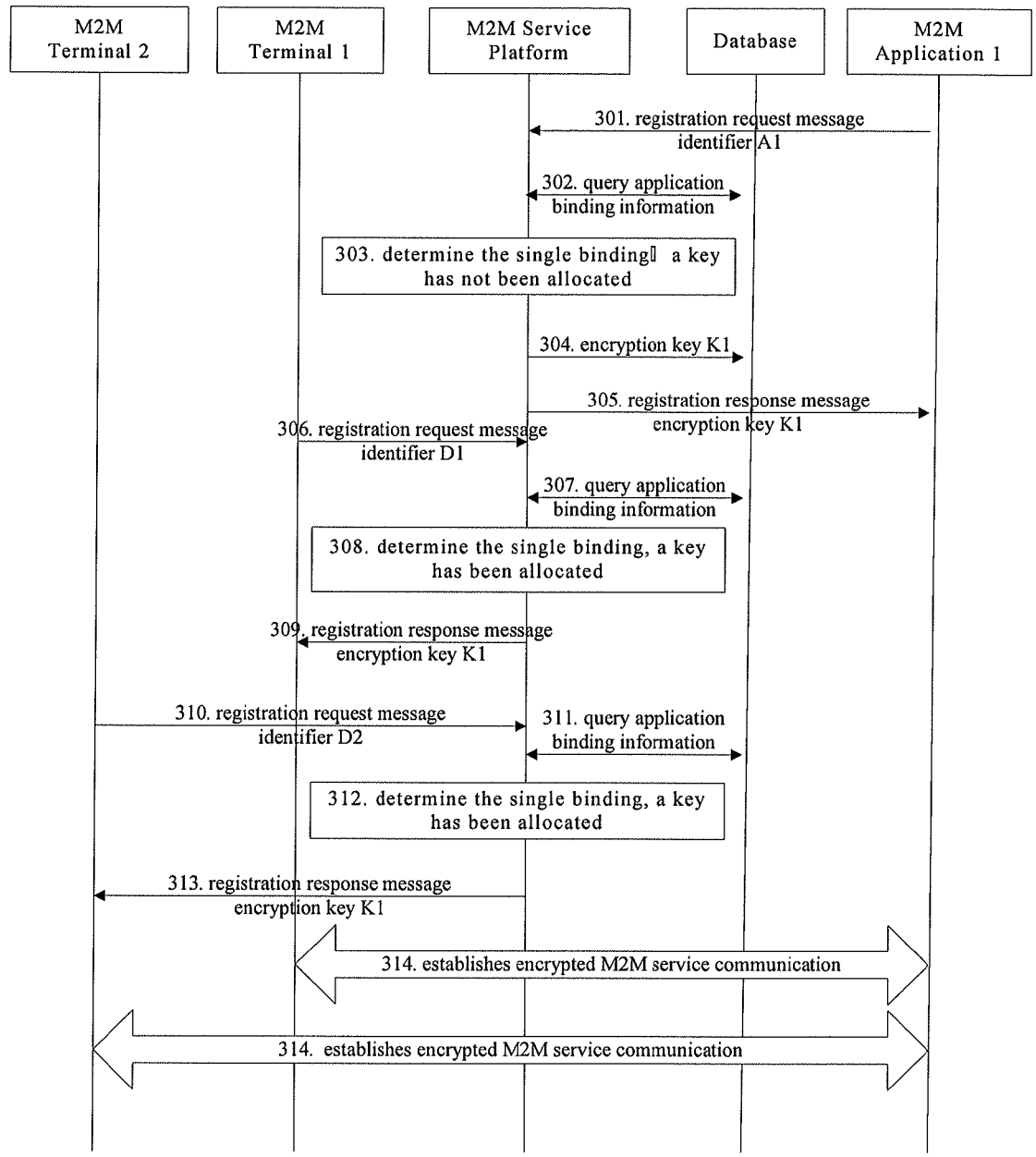
FIG. 7 is a schematic flowchart of another encrypted communication method provided in an embodiment.

In the present embodiment, it is assumed that when a M2M service is subscribed and activated, both M2M terminals 1, 2 (such as, intelligent electric meter) are only bound to a M2M application 1 (such as, electric meter reading system of a power supply company), and an encrypted communication way needs to be adopted between the M2M terminals 1, 2 and the M2M application 1, and communication configuration related data is stored in a subscription database of a M2M service operator. When the M2M application 1 firstly registers to M2M service platform, and then the M2M terminals 1, 2 register to the M2M service platform, as shown in FIG. 7, the method that the M2M service platform allocates an encryption key for the M2M terminals 1, 2 and the M2M application 1 comprises:

301, the M2M application 1 sends a registration request message to the M2M service platform, wherein the registration request message comprises an identifier A1 of the M2M application 1.

Optionally, the registration request message may further comprise indication information for requesting an encryption key;

302, the M2M service platform authenticates the M2M application 1 according to the identifier A1, and queries, after the authentication is passed, the local or remote subscription database, to obtain the subscription binding relationship information of the M2M application 1;

303, according to the obtained binding relationship information, the M2M service platform determines that the M2M terminals 1, 2 only have a binding relationship with the M2M application 1, namely that there exists a terminal which is only bound to the M2M application 1, and determines that an encryption key has not been allocated for the M2M application 1 yet;

304, the M2M service platform allocates a same encryption key K1 for the M2M terminals 1, 2 and the M2M application 1, and stores the encryption key K1 in the local or remote database;

305, the service platform returns a registration response message to the M2M application 1, wherein the registration response message comprises the encryption key K1.

Optionally, in order to guarantee the security of the encryption key K1, the M2M platform may perform an encryption processing to the encryption key K1 by a basic key pre-shared with the M2M application 1, and then send the encryption key K1 encrypted to the M2M application 1 through the registration response message. Or, other secure transmission technologies may be adopted to send the encryption key K1 to the M2M application 1.

306, the M2M terminal 1 sends a registration request message to the M2M service platform, wherein the registration request message comprises the identifier D1 of the M2M terminal 1.

Optionally, the registration request message may further comprise indication information for requesting an encryption key.

307, the M2M service platform authenticates the M2M terminal 1 according to the identifier D1, and queries, after the authentication is passed, the local or remote database to obtain the subscription binding relationship information of the M2M terminal 1.

308, according to the obtained binding relationship information, the M2M service platform determines that the M2M terminal 1 only has a binding relationship with the M2M application 1, and determines that the encryption key K1 has already been allocated for the M2M terminal 1;

309, the M2M service platform returns a registration response message to the M2M terminal 1, wherein the registration response message comprises the encryption key K1.

Optionally, in order to guarantee the security of the encryption key K1, the M2M platform may perform encryption processing to the encryption key K1 by a basic key pre-shared with the M2M terminal 1, and then send the encryption key K1 encrypted to the M2M terminal 1 through the registration response message. Or, other secure transmission technologies may be adopted to send the encryption key K1 to the M2M terminal 1.

310, the M2M terminal 2 sends a registration request message to the M2M service platform, wherein the registration request message comprises the identifier D2 of the M2M terminal 2.

Optionally, the registration request message may further comprise indication information for requesting the encryption key.

311, the M2M service platform authenticates the M2M terminal 2 according to the identifier D2, and queries, after the authentication is passed, the local or remote subscription database to obtain the subscription binding relationship information of the terminal 2.

312, according to the obtained binding relationship information, the M2M service platform determines that the M2M terminal 2 only has a binding relationship with the M2M application 1, and determines that the encryption key K1 has already been allocated for the M2M terminal 2.

313, the M2M service platform returns a registration response message to the M2M terminal 2, wherein the registration response message comprises the encryption key K1.

Optionally, in order to guarantee the security of the encryption key K1, the M2M platform may perform encryption processing to the encryption key K1 by a basic key pre-shared with the M2M terminal 2, and then send the encryption key K1 encrypted to the M2M terminal 2 through the registration response message. Or, other secure transmission technologies may be adopted to send the encryption key K1 to the M2M terminal 2.

314, the M2M terminals 1, 2 and the M2M application 1 establish an encrypted unicast or multicast M2M service communication by using the encryption key K1 allocated by the M2M service platform. The M2M service platform may directly and transparently transmit the encrypted service message interacted between the M2M terminals 1, 2 and the M2M application 1, and need not to perform the operation of decryption and re-encryption when the information is forwarded.

Optionally, if the State Security Authority or the related Regulation Institutions need to lawfully monitor the M2M service communication between the M2M terminals 1,2 and the M2M application 1, the M2M service platform may, by using the stored encryption key K1, directly perform the operation of decryption or indicate other network entity to perform the operation of decryption.

Embodiment 3

Figure 8:
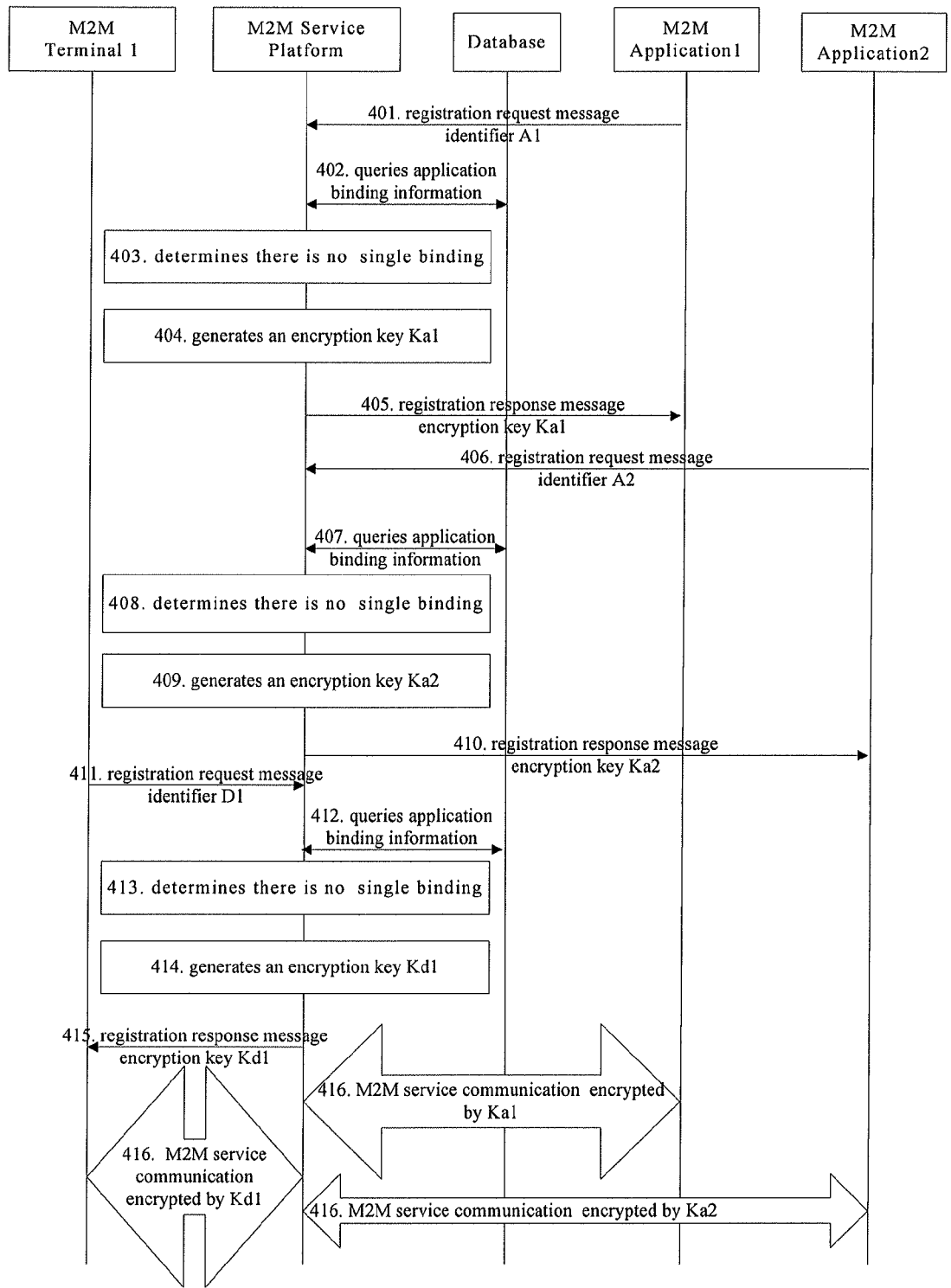
FIG. 8 is a schematic flowchart of another encrypted communication method provided in an embodiment.

In the present embodiment, it is assumed that when a M2M service is subscribed and activated, M2M applications 1, 2 (such as, transport vehicle fleet monitoring system, vehicle repair center) are only bound to a M2M terminal 1 (such as, vehicle failure sensor), and an encrypted communication way needs to be adopted between the M2M terminal 1 and the M2M applications 1, 2, and communication configuration related data is stored in a subscription database of a M2M service operator. As shown in FIG. 8, the method that the M2M service platform allocates an encryption key for the M2M terminal 1 and the M2M application 1, 2 comprises:

401, the M2M application 1 sends a registration request message to the M2M service platform, wherein the registration request message comprises an identifier A1 of the M2M application 1.

Optionally, the registration request message may further comprise indication information for requesting an encryption key.

402, the M2M service platform authenticates the M2M application 1 according to the identifier A1, and queries, after the authentication is passed, the local or remote subscription database to obtain the subscription binding relationship information of the M2M application 1;

403, the M2M service platform determines that there does not exist an M2M terminal which is only bound to the M2M application 1;

404, the M2M service platform allocates an encryption key Ka1 separately for the M2M application 1;

405, the service platform returns a registration response message to the M2M application 1, wherein the registration response message comprises the encryption key Ka1.

Optionally, in order to guarantee the security of the encryption key Ka1, the M2M platform may perform encryption processing to the encryption key Ka1 by a basic key pre-shared with the M2M application 1, and then send the encryption key Ka1 encrypted to the M2M application 1 through the registration response message. Or, other secure transmission technologies may be adopted to send the encryption key Ka1 to the M2M application 1.

406, the M2M application 2 sends a registration request message to the M2M service platform, wherein the registration request message comprises the identifier A2 of the M2M application 2.

Optionally, the registration request message may further comprise indication information for requesting an encryption key.

407, the M2M service platform authenticates the M2M application 2 according to the identifier A2, and queries, after the authentication is passed, the local or remote database to obtain the subscription binding relationship information of the M2M application 2;

408, the M2M service platform determines that there does not exist a M2M terminal which is only bound to the M2M application 2 according to the obtained binding relationship information;

409, the M2M service platform allocates an encryption key Ka2 separately for the M2M application 2;

410, the M2M service platform returns a registration response message to the M2M application 2, wherein the registration response message comprises the encryption Ka2.

Optionally, in order to guarantee the security of the encryption key Ka2, the M2M platform may perform encryption processing to the encryption key Ka2 by using a basic key pre-shared with the M2M application 2, and then send the encryption key Ka2 encrypted to the M2M application 2 through the registration response message. Or, other secure transmission technologies may be adopted to send the encryption key Ka2 to the M2M application 2.

411, the M2M terminal 1 sends a registration request message to the M2M service platform, wherein the registration request message comprises the identifier D1 of the M2M terminal 1.

Optionally, the registration request message may further comprise indication information for requesting an encryption key.

412, the M2M service platform authenticates the M2M terminal 1 according to the identifier D1, and queries, after the authentication is passed, the local or remote subscription database to obtain the subscription binding relationship information of the M2M terminal 1;

413, the M2M service platform determines that the M2M terminal 1 has a binding relationship with the M2M applications 1, 2 simultaneously according to the obtained binding relationship information;

In addition, even if the M2M service platform determines that the M2M terminal 1 does not have a binding relationship with any M2M application, the subsequent process is still applicable.

414, the M2M service platform allocates an encryption key Kd1 separately for the M2M application 1;

415, the M2M service platform returns a registration response message to the M2M terminal 1, wherein the registration response message comprises the encryption key Kd1.

Optionally, in order to guarantee the security of the encryption key Kd1, the M2M platform may perform encryption processing to the encryption key Kd1 by using a basic key pre-shared with the M2M terminal 1, and then send the encryption key Kd1 encrypted to the M2M terminal 1 through the registration response message. Or, other secure transmission technologies may be adopted to send the encryption key Kd1 to the M2M terminal 1.

416, a M2M service communication which is encrypted by the encryption key Kd1 is established between the M2M terminals 1 and the M2M application 1, while the M2M applications 1,2 encrypt a M2M service communication with the M2M service platform by adopting the encryption key Ka1, Ka2 respectively. The M2M service platform needs the operation of decryption and re-encryption during the process of forwarding the M2M service message.

Optionally, if the State Security Authority or the related Regulation Institutions need to lawfully monitor the M2M service communication between the M2M terminal 1 and the M2M application 1, 2, the M2M service platform may directly send the content decrypted during the process of forwarding the M2M service message to the State Security Authority or the related Regulation Institutions.

Embodiment 4

Figure 9:
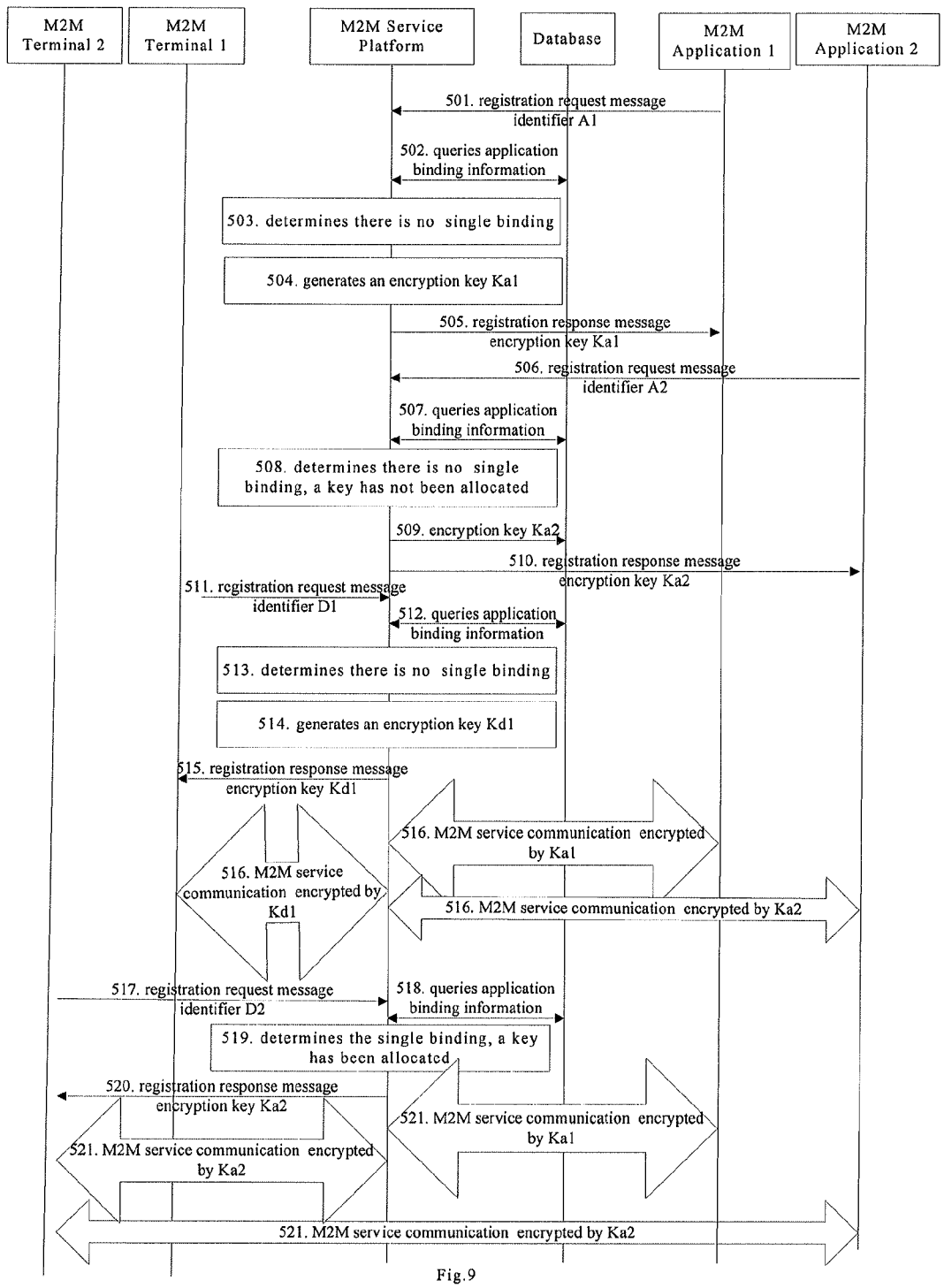
FIG. 9 is a schematic flowchart of another encrypted communication method provided in an embodiment.

In the present embodiment, it is assumed that when a M2M service is subscribed and activated, a M2M terminal 1 is bound to the M2M applications 1, 2 simultaneously, and a M2M terminal 2 is only bound to the M2M application 2, and an encrypted communication way needs to be adopted between the M2M terminals and the M2M applications, and communication configuration related data is stored in a subscription database of a M2M service operator. As shown in FIG. 9, the method that the M2M service platform allocates an encryption key for the M2M terminals 1, 2 and the M2M applications 1, 2 comprises:

501, the M2M application 1 sends a registration request message to the M2M service platform, wherein the registration request message comprises the identifier A1 of the M2M application 1.

Optionally, the registration request information may further comprise indication information for requesting an encryption key.

502, the M2M service platform authenticates the M2M application 1 according to the identifier A1, and queries, after the authentication is passed, the local or remote subscription database to obtain the subscription binding relationship information of the M2M application 1;

503, the M2M service platform determines that there does not exist a M2M terminal which is only bound to the M2M application 1 according to the obtained binding relationship information;

504, the M2M service platform allocates an encryption key Ka1 separately for the M2M application 1;

505, the M2M service platform returns a registration response message to the M2M application 1, wherein the registration response message comprises the encryption key Ka1.

Optionally, in order to guarantee the security of the encryption key Ka1, the M2M service platform may perform encryption processing to the encryption key Ka1 by using a basic key pre-shared with the M2M application 1, and then send the encryption key Ka1 encrypted to the M2M application 1 through the registration response message. Or, other secure transmission technologies may be adopted to send the encryption key Ka1 to the M2M application 1.

506, the M2M application 2 sends a registration request message to the M2M service platform, wherein the registration request message comprises an identifier A2 of the M2M application 2.

Optionally, the registration request message may further comprise indication information for requesting an encryption key.

507, the M2M service platform authenticates the M2M application 2 according to the identifier A2, and queries, after the authentication is passed, the local or remote database to obtain the subscription binding relationship information of the M2M application 2;

508, according to the obtained binding relationship information, the M2M service platform determines that the M2M terminal 2 only has a binding relationship with the M2M application 2, namely that there exists a M2M terminal which is only bound to the M2M application 2, and determines that an encryption key has not been allocated for the M2M application 2 and the M2M terminal 2 yet;

509, the M2M service platform allocates a same encryption key Ka2 for the M2M terminal 2 and the M2M application 2, and stores the encryption key Ka2 in the local or remote database;

510, the M2M service platform returns a registration response message to the M2M application 2, wherein the registration response message comprises the encryption key Ka2.

Optionally, in order to guarantee the security of the encryption key Ka2, the M2M service platform may perform encryption processing to the encryption key Ka2 by using a basic key pre-shared with the M2M application 2, and then send the encryption key Ka2 encrypted to the M2M application 2 through the registration response message. Or, other secure transmission technologies may be adopted to send the encryption key Ka2 to the M2M application 2.

511, the M2M terminal 1 sends a registration request message to the M2M service platform, wherein the registration request message comprises the identifier D1 of the M2M terminal 1.

Optionally, the registration request message may further comprise indication information for requesting an encryption key.

512, the M2M service platform authenticates the M2M terminal 1 according to the identifier D1, and queries, after the authentication is passed, the local or remote subscription database, to obtain the subscription binding relationship information of the M2M terminal 1;

513, the M2M service platform determines that the M2M terminal 1 has a binding relationship with the M2M applications 1, 2 simultaneously according to the obtained binding relationship information;

514, the M2M service platform allocates an encryption key Kd1 separately for the M2M terminal 1;

515, the M2M service platform returns a registration response message to the M2M terminal 1, wherein the registration response message comprises the encryption key Kd1.

Optionally, in order to guarantee the security of the encryption key Kd1, the M2M platform may perform encryption processing to the encryption key Kd1 by using a basic key pre-shared with the M2M terminal 1, and then send the encryption key Kd1 encrypted to the M2M terminal 1 through the registration response message. Or, other secure transmission technologies may be adopted to send the encryption key Kd1 to the M2M terminal 1.

516, a M2M service communication which is encrypted by the encryption Kd1 is established between the M2M terminal 1 and the M2M service platform, while the M2M applications 1, 2 encrypt the M2M service communication with the M2M service platform by using the encryption keys Ka1, Ka2 respectively. The M2M service platform needs to perform the operation of decryption and re-encryption when forwarding the service messages between the M2M terminal 1 and the M2M applications 1, 2.

517, the M2M terminal 2 sends a registration request message to the M2M service platform, wherein the registration request message comprises the identifier D2 of the M2M terminal 2.

Optionally, the registration request message may further comprise indication information for requesting an encryption key.

518, the M2M service platform authenticates the M2M terminal 2 according to the identifier D2, and queries, after the authentication is passed, the local or remote subscription database to obtain the subscription binding relationship information of the M2M terminal 2;

519, according to the obtained binding relationship information, the M2M service platform determines that the M2M terminal 2 only has a binding relationship with the M2M application 2, and determines that the encryption key Ka2 has already been allocated for the M2M terminal 2;

520, the M2M service platform returns a registration response message to the M2M terminal 2, wherein the registration response message comprises the encryption key Ka2.

Optionally, in order to guarantee the security of the encryption key Ka2, the M2M service platform may perform encryption processing to the encryption key Ka2 by using a basic key pre-shared with the M2M terminal 2, and then send the encryption key Ka2 encrypted to the M2M terminal 2 through the registration response message. Or, other secure transmission technologies may be adopted to send the encryption key Kd2 to the M2M terminal 2.

521, a M2M service communication which is encrypted by the encryption key Ka2 is established between the M2M terminal 2 and the M2M service platform, while the M2M applications 1, 2 respectively adopt the encryption keys Ka1, Ka2 to encrypt the M2M service communications with the M2M service platform. The M2M service platform may directly and transparently transmit the M2M service message between the M2M terminal 2 and the M2M application 2, and need not to perform the operation of decryption and re-encryption, so as to reduce the processing load and improve the system performance.

The present embodiment has described a scene that the M2M application registers firstly. If the M2M terminal registers firstly, the M2M service platform allocates the encryption key Ka2 for the M2M terminal 2 firstly, and then distributes the same encryption key Ka2 for the M2M application 2, and still distributes the encryption key Ka1 and Kd1 respectively and separately for the M2M application 1 and the M2M terminal 1.

Embodiment 5

Figure 10:
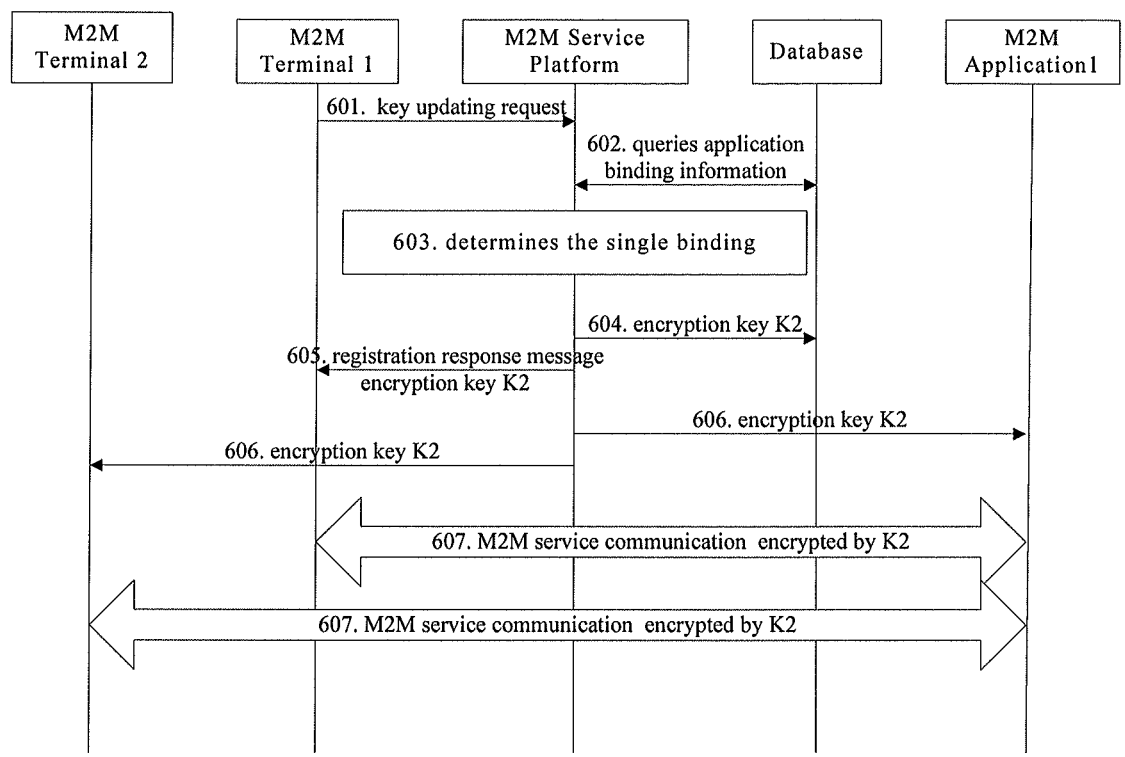
FIG. 10 is a schematic flowchart of another encrypted communication method provided in an embodiment.

When the embodiment 1 or 2 has already been finished and the communication encryption key between the M2M terminals 1, 2 and the M2M application 1 needs to be updated (such as, the M2M terminal detects that the valid period of the encryption key is expired), as shown in FIG. 10, the method that the M2M service platform updates the encryption key for the M2M terminals 1, 2 and the M2M application 1 comprises:

601, when finding the encryption key K1 is about to be expired, the M2M terminal 1 sends a key updating request, wherein the key updating request comprises an identifier D1 of the M2M terminal 1;

602, the M2M service platform obtains subscription binding relationship information of the M2M terminal 1 according to the identifier D1;

603, according to the obtained binding relationship information, the M2M service platform determines that the M2M terminal 1 only has a binding relationship with the M2M application 1, and that there exists a M2M terminal 2 which is only bound to the M2M application 1, and that it is needed to update the encryption key for the M2M terminals 1, 2 and the M2M application 1 simultaneously;

604, the M2M service platform reallocates a same new encryption key K2 for the M2M terminals 1, 2 and the M2M application 1, and stores the encryption key K2 in the local or remote database;

605, the M2M service platform sends a key updating response message to the M2M terminal 1, wherein the key updating response message comprises the reallocated new encryption key K2.

Optionally, in order to guarantee the security of the encryption key K2, the M2M platform may perform encryption processing to the encryption key K2 by using a basic key pre-shared with the M2M terminal 1, and then send the encryption key K2 encrypted to the M2M terminal 1 through a registration response message. Or, other secure transmission technologies may be adopted to send the encryption key K2 to the M2M terminal 1.

606, the M2M service platform actively pushes the updated new encryption key K2 to the M2M terminal 2 and the M2M application 1.

For example, the M2M service platform may adopt a short message, OMA-PUSH and other technologies to realize the push. Optionally, the M2M service platform may perform encryption protection to the encryption key K2 by using a basic key pre-shared with the M2M terminal 2 and the M2M application 1 or by using the encryption key K1. Or, other secure transmission technologies may be adopted to send the encryption key K2 to the M2M terminal 2 and the M2M application 1. Further optionally, the M2M service platform may require the M2M terminal 2 and the M2M application 1 to return a confirmation message of the encryption key being updated successfully.

607, the M2M terminals 1, 2 and the M2M application 1 establish the encrypted unicast or multicast M2M service by using the new encryption key K2 reallocated by the M2M service platform. The M2M service platform may directly and transparently transmit the encrypted service message between the M2M terminals 1, 2 and the M2M application 1, and need not to perform the operation of decryption or re-encryption when forwarding the message.

Optionally, if the State Security Authority or the related Regulation Institutions need to lawfully monitor the M2M service communication between the M2M terminals 1, 2 and the M2M application 1, the M2M service platform may directly perform or indicate other network entity to perform the operation of decryption to the corresponding M2M service message.

In the present embodiment, the key updating process initiated by the M2M terminal 1 has been described, while the encryption updating process may be initiated by the M2M terminal 2, the M2M application 1, or the M2M service platform during actual implementation. Since the specific method is similar, it is not described repeatedly.

Embodiment 6

Figure 11:
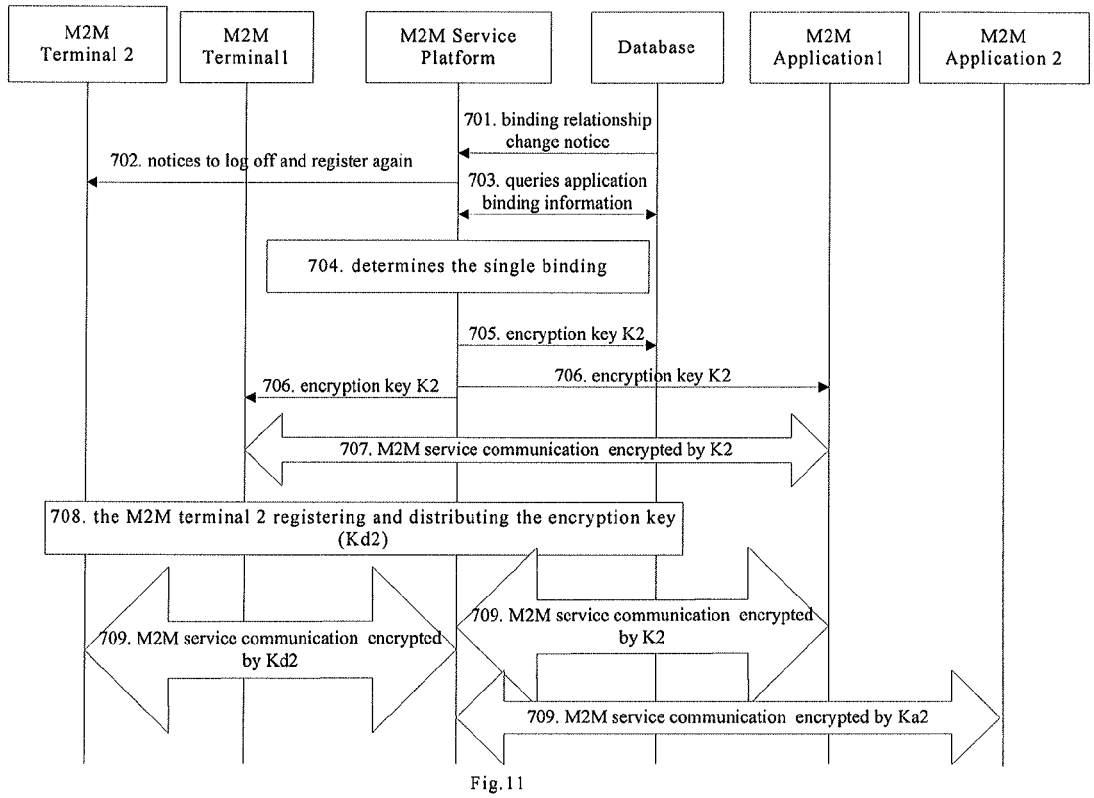
FIG. 11 is a schematic flowchart of another encrypted communication method provided in an embodiment.

After the embodiment 1, or 2 is finished, the binding relationship between the M2M terminal 2 and the M2M application 1 is added into the subscription database (namely that the M2M terminal 2 is bound to the M2M applications 1, 2 simultaneously), and an encryption key Ka2 is allocated for the M2M application 2 according to the binding relationship between the M2M application 2 and other M2M terminals. As shown in the FIG. 11, the method that the M2M service platform updates the encryption key for the M2M terminals 1, 2 and the M2M application 1 comprises:

701, when the binding relationship between the M2M terminal 2 and the M2M application 2 is added into the subscription database, the M2M service platform obtains a corresponding binding relationship change notice;

702, according to the binding relationship change notice, the M2M service platform determines the changed binding relationship of the M2M terminal 2, and notices the M2M terminal 2 to register again after logging off.

703, according to the binding relationship before updated, the M2M service platform determines that the terminals which are only bound to the M2M application 1 includes the M2M terminal 2, and thus determines that it is needed to update the encryption key for the M2M application 1, and thus obtains the subscription binding relationship information of the M2M application 1;

704, the M2M service platform determines that all of the terminals which are only bound to the M2M application 1 include a M2M terminal 1 besides the M2M terminal 2, and that it is needed to update the encryption key for the M2M terminal 1 and the M2M application 1 simultaneously;

705, the M2M service platform reallocates a same new encryption key K2 for the M2M terminal 1 and the M2M application 1, and stores the encryption key K2 in the local or remote database;

706, the M2M service platform actively pushes the updated new encryption key K2 to the M2M terminal 1 and the M2M application 1.

For example, the M2M service platform may adopt a short-message, OMA-PUSH or other technologies to realize the push. Optionally, the M2M service platform may perform encryption protection to the encryption key K2 by using a basic key pre-shared with the M2M terminal 1 and the M2M application 1 or by using the encryption key K1. Or, other secure transmission technologies may be adopted to send the encryption key K2 to the M2M terminal 1 and the M2M application 1. Further optionally, the M2M service platform may further request the M2M terminal 1 and the M2M application 1 to return a confirmation message of the key being updated successfully.

707, the M2M terminal 1 and the M2M application 1 establish an encrypted unicast or multicast M2M service communication by using the new encryption key K2 reallocated by the M2M service platform.

708, the M2M terminal 2 registers to the M2M service platform again, and obtains a separate encryption key Kd2 according to the method described in the embodiment 3;

709, a M2M service communication which is encrypted by the encryption key Kd2 is established between the M2M terminal 2 and the M2M service platform, while the M2M applications 1,2 encrypt the M2M service communication with the M2M service platform by using the encryption K2, Ka2 respectively. The M2M service platform needs to perform the operation of decryption and re-encryption during the process of forwarding a M2M service message of the M2M terminal 2.

In the present embodiment, the key updating process caused by the change of the subscription binding relationship of the M2M terminal 2 has been described, while in actual implementation, the encryption key updating may be caused by the change of subscription binding relationship of the M2M terminal 1, M2M application 1. Conclusively, if the M2M terminal (or the M2M application) has a single binding relationship with the related M2M application (or the M2M terminal) before the subscription binding relationship is changed, after the binding relationship is updated, the M2M service platform needs to update the encryption key for the M2M application (or the M2M terminal), and the M2M terminal (the M2M application) needs to register to the M2M service platform again, and re-obtains an encryption key according to the updated subscription binding relationship. If the M2M terminal (the M2M application) does not have a single binding relationship with the related M2M application (or the M2M terminal) before the subscription binding relationship is updated, the M2M service platform does not need to update the encryption key for the M2M application (or the M2M terminal), but the M2M terminal (or the M2M application) still needs to register to the M2M service platform again, and re-obtain an encryption key according to the updated subscription binding relationship.

The encrypted communication method in the embodiments, through allocating a same encryption key for a first application and a terminal which is only bound to the first application, separately allocating an encryption key for those terminals that are bound to a plurality of applications or are not bound to any application, separately allocating an encryption key for the first application when determined that no terminal is only bound to the first application, and transparently transmitting the information interacted between the terminal and the first application and encrypted by the same encryption key when the terminal and the first application communicate with each other by using the allocated same encryption key, can reduce the decryption and re-encryption processing of the service platform during information forwarding, and thus reduce the processing load of the service platform, and also reduce the processing load of the terminal with limited processing capability and power supply since the terminal also only needs to use a single encryption key to perform the encryption and decryption processing when sending or receiving service message. Accordingly, the encrypted communication method in the embodiments can reduce the processing load of devices in the M2M system and improve the service processing performance of the M2M system on the premise that the data security can be guaranteed.

Figure 12:
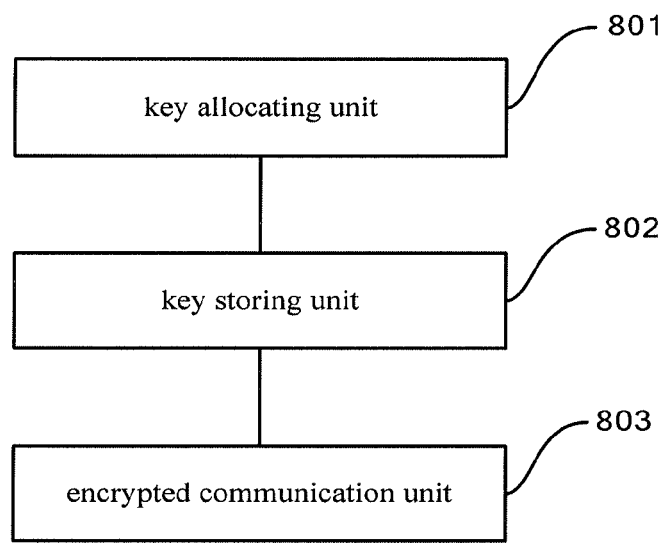
FIG. 12 is a schematic structure chart of an encrypted communication apparatus provided in an embodiment.

Corresponding to the aforesaid method, an embodiment further provides an encrypted communication apparatus. As shown in FIG. 12, the apparatus comprises:

a key allocating unit 801, configured to allocate a same encryption key for a first application and a terminal which is only bound to the first application;

a key storing unit 802, configured to store the encryption key which is allocated for the terminal or the first application by the key allocating unit 801;

an encrypted communication unit 803, configured to transparently transmit the information interacted between the terminal and the first application when determining that the terminal communicates with the first application by using the same encryption key according to the encryption key stored in the key storing unit 802.

Furthermore, the key allocating unit 801 is further configured to allocate an encryption key separately for a terminal which is bound to a plurality of applications or is not bound to any application, and allocate an encryption key separately for the first application when determining that there does not exist a terminal which is only bound to the first application.

Furthermore, the key allocating unit 801 particularly comprises:

a request receiving subunit, configured to receive a registration request or a key obtaining request sent by the terminal;

a binding obtaining subunit, configured to obtain the binding relationship of the terminal according to the registration request or the key obtaining request received by the request receiving subunit;

a key allocating subunit, configured to allocate for the terminal the same encryption key as that of the first application when determining that the terminal is only bound to the first application according to the binding relationship obtained by the binding obtaining subunit; or, configured to allocate an encryption key separately for the terminal when determining that the terminal is bound to a plurality of applications or is not bound to any application according to the binding relationship obtained by the binding obtaining subunit.

Furthermore, the binding obtaining subunit particularly comprises:

an identifier obtaining module, configured to obtain an identifier of the terminal from the registration request or the key obtaining request sent by the terminal;

an information obtaining module, configured to obtain the subscription configuration information of the terminal according the identifier obtained by the identifier obtaining module;

a binding obtaining module, configured to obtain the binding relationship of the terminal according to the subscription configuration information obtained by the information obtaining module.

Or, the binding obtaining subunit particularly comprises:

an indication obtaining module, configured to obtain indication information from the registration request or the key obtaining request sent by the terminal;

a binding obtaining module, configured to obtain the binding relationship of the terminal according the indication information obtained by the indication obtaining module.

Furthermore, the key allocating subunit particularly comprises:

a key obtaining module, configured to obtain the encryption key allocated for the first application when determining that the terminal is only bound to the first application according to the binding relationship of the terminal and an encryption key has already been allocated for the first application;

a key generating module, configured to generate an encryption key corresponding to the terminal when determining that the terminal is only bound to the first application according to the binding relationship of terminal and an encryption key has not been allocated for the first application; or, configured to generate an encryption key corresponding to the terminal when determining that the terminal is bound to a plurality of applications or is not bound to any application;

a key sending module, configured to send the encryption key obtained by the key obtaining module or the encryption key generated by the key generating module to the terminal.

Or, the key allocating unit 801 particularly comprises:

a request receiving subunit, configured to receive a registration request or a key obtaining request sent by the first application;

a binding obtaining subunit, configured to obtain the binding relationship of the first application according to the registration request or the key obtaining request received by the request receiving subunit;

a key allocating subunit, configured to allocate for the first application the same encryption key as that of the terminal which is only bound to the first application when determining that there exists the terminal which is only bound to the first application according to the binding relationship obtained by the binding obtaining subunit; or, configured to allocate an encryption key separately for the first application when determining that there does not exist a terminal which is only bound to the first application according to the binding relationship obtained by the binding obtaining subunit.

Furthermore, the binding obtaining subunit particularly comprises:

an identifier obtaining module, configured to obtain the identifier of the first application from the registration request or the key obtaining request sent by the first application;

an information obtaining module, configured to obtain the subscription configuration information of the first application according to the identifier obtained by the identifier obtaining module;

a binding obtaining module, configured to obtain the binding relationship of the first application according to the subscription configuration information obtained by the information obtaining module.

Or, the binding obtaining subunit particularly comprises:

an indication obtaining module, configured to obtain indication information from the registration request or the key obtaining request sent by the first application;

a binding obtaining module, configured to obtain the binding relationship of the first application according to the indication information obtained by the indication obtaining module.

Furthermore, the key allocating subunit particularly comprises:

a key obtaining module, configured to obtain the encryption key allocated for the terminal which is only bound to the first application when determining that there exists a terminal which is only bound to the first application according to the binding relationship of the first application and determining an encryption key has already been allocated for the terminal which is only bound to the first application;

a key generating module, configured to generate an encryption key corresponding to the first application when determining that there exists a terminal which is only bound to the first application according to the binding relationship of the first application, and determining an encryption key has not been allocated for the terminal which is only bound to the first application; or, configured to generate generating an encryption key corresponding to the first application when determining that there does not exist a terminal which is only bound to the first application according to the binding relationship of the first application;

a key sending module, configured to send the encryption key obtained by the key obtaining module or the encryption key generated by the key generating module to the first application.

Furthermore, the key allocating unit 801 further comprises:

an updating triggering determining subunit, configured to determine the performing of an updating corresponding to the first terminal upon receiving a key updating request of the first terminal or triggering a updating setting rule of the first terminal;

an updating binding obtaining subunit, configured to obtain the binding relationship of a first terminal when the updating triggering determining subunit determines the performing of the updating of the first terminal;

an updating key generating subunit, configured to determine a terminal which is only bound to a first application and generating an encryption key corresponding to the determined terminal and the first application when determining the first terminal is only bound to the first application according to the binding relationship obtained by the updating binding obtaining subunit; or, for generating an encryption key corresponding to the first terminal when determining that the first terminal is bound to a plurality of applications or is not bound to any application according to the binding relationship obtained by the updating binding obtaining subunit;

an updating key sending subunit, configured to send the encryption key generated by the updating key generating subunit to the first application and the terminal which is only bound to the first application; or, configured to send the encryption key generated by the updating key generating subunit to the first terminal.

Or, the key allocating unit further comprises:

an updating triggering determining subunit, configured to determine the performing of the updating corresponding to the first application upon receiving the key updating request of the first application or triggering a updating setting rule of the first application;

an updating binding obtaining subunit, configured to obtain the binding relationship of first application when the updating triggering determining subunit determines the performing of the updating of the first application;

an updating key generating subunit, configured to generate an encryption key corresponding to the first application and the terminal which is only bound to the first application when determining that there exists a terminal which is only bound to the first application according to the binding relationship obtained by the updating binding obtaining subunit; or, configured to generate an encryption key corresponding to the first application when determining that there does not exist a terminal which is only bound to the first application according to the binding relationship obtained by the updating binding obtaining subunit;

an updating key sending subunit, configured to send the encryption key generated by the updating key generating subunit to the first application and the terminal which is only bound to the first application; or, configured to send to the encryption key generated by the updating key generating subunit to the first application.

The encrypted communication apparatus in the embodiments, through allocating a same encryption key for a first application and a terminal which is only bound to the first application and transparently transmitting the information interacted between the terminal and the first application and encrypted by the same encryption key when the terminal and the first application communicate with each other by using the allocated same encryption key, can reduce the decryption and re-encryption processing of the service platform during information forwarding, and thus reduce the processing load of the service platform, and also reduce the processing load of the terminal with limited processing capability and power supply since the terminal also only needs to use a single encryption key to perform the encryption and decryption processing when sending or receiving service message. Accordingly, the encrypted communication apparatus in the embodiments can reduce the processing load of devices in the M2M system and improve the service processing performance of the M2M system on the premise that the data security can be guaranteed.

Figure 13:
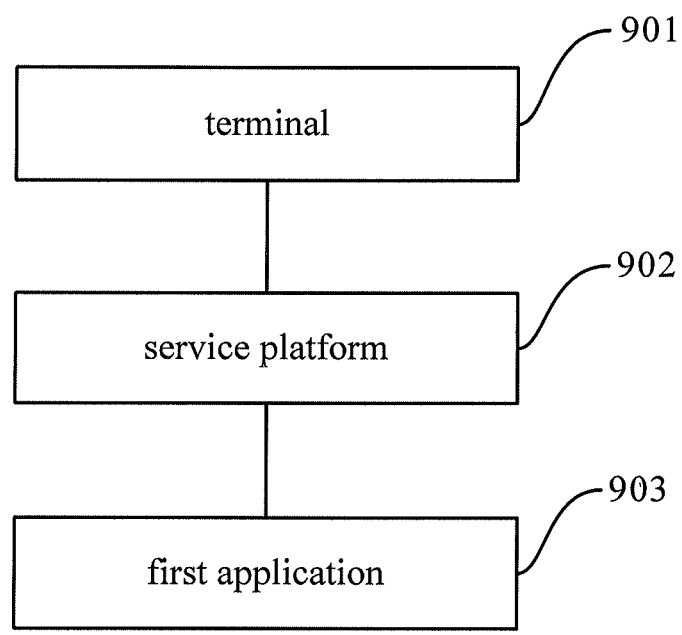
FIG. 13 is a schematic structure chart of an encrypted communication system provided in an embodiment.

Corresponding to the aforesaid method and apparatus, the embodiments further provides an encrypted communication system. As shown in FIG. 13, the system comprises a terminal 901, a service platform 902 and a first application 903;

The service platform 902, configured to allocate a same encryption key for the first application 903 and the terminal 901 which is only bound to the first application; and when determining that the terminal 901 communicates with the first application 903 by using the same encryption key, for transparently transmitting the information interacted between the terminal 901 and the first application 903;

the terminal 901, configured to obtain the encryption key allocated by the service platform 902 and encrypting or decrypting the information interacted with the first application 903 according to the obtained encryption key;

the first application 903, configured to obtain the encryption key allocated by the service platform 902, and encrypt or decrypt the information interacted with the terminal 901 according to the obtained encryption key.

The encrypted communication system in the embodiments, through allocating a same encryption key for a first application and a terminal which is only bound to the first application and transparently transmitting the information interacted between the terminal and the first application and encrypted by the same encryption key when the terminal and the first application communicate with each other by using the allocated same encryption key, can reduce the decryption and re-encryption processing of the service platform during information forwarding, and thus reduce the processing load of the service platform, and also reduce the processing load of the terminal with limited processing capability and power supply since the terminal also only needs to use a single encryption key to perform the encryption and decryption processing when sending or receiving service message. Accordingly, the encrypted communication system in the embodiments can reduce the processing load of devices in the M2M system and improve the service processing performance of the M2M system on the premise that the data security can be guaranteed.

Persons of ordinary skills in the art understand that all or part of the steps of the method specified in any of the embodiments above may be implemented by a program instructing relevant hardware. The program may be stored in a computer readable storage medium. When the program runs, the steps of the embodiments of the aforesaid methods may be executed. The storage medium may be a magnetic disk, an optical disk, a Read Only Memory (Read-Only memory, ROM), or a Random Access Memory (Random Access Memory, RAM).

The foregoing describes only preferred embodiments. The protection and scope afforded by claims is not limited to these embodiments. It is understood that alteration or substitution may be made to these embodiments by those skilled in the art. Applicant considers such modified embodiments to fall within the protection scope of claims. Therefore, the protection scope of the application should be determined according to claims.

What is claimed is:

1. An encrypted communication method in a service platform of a Machine to Machine (M2M) system, comprising:

determining, by the service platform, a first terminal in the M2M system is only bound with a first application, wherein the first terminal only bound with the first application communicates with only the first application and does not communicate with other application than the first application;

allocating, by the service platform, based on the determination result of the first terminal only bound with the first application, a same encryption key for the first application and the first terminal;

transmitting, by the service platform, based on the determination result of which the first terminal is only bound with the first application, information encrypted by the first terminal using the same encryption key from the first terminal to the first application without performing decryption or re-encryption processing to the information; and transmitting, by the service platform, based on the determination result of which the first terminal is only bound with the first application, information encrypted by the first application using the same encryption key from the first application to the first terminal without performing decryption or re-encryption processing to the information;

wherein the encrypted communication method further comprises:

upon receiving a key updating request of the first terminal or triggering an updating setting rule of the first terminal:

obtaining a binding relationship of the first terminal;

when it is determined that the first terminal is only bound to the first application according to the binding relationship of the first terminal identifying the first terminal that is only bound to the first application;

generating an encryption key;
sending the generated encryption key to the first application and the first terminal that is only bound to the first application; and
when it is determined that the first terminal is bound to a plurality of applications or is not bound to any application:
generating an encryption key and sending the generated encryption key to the first terminal; or
the encrypted communication method further comprises:
upon receiving a key updating request of the first application or triggering updating setting rule of the first application:
obtaining a binding relationship of the first application;
when it is determined that there exists a terminal that is only bound to the first application according to the binding relationship of the first application:
generating an encryption key;
sending the generated encryption key to the first application and the first terminal that is only bound to the first application; and
when it is determined that there does not exist a first terminal that is only bound to the first application according to the binding relationship of the first application, generating an encryption key and sending the generated encryption key to the first application.

2. The encrypted communication method according to claim 1, further comprising:
receiving a registration request or a key obtaining request from the first terminal;
obtaining a binding relationship of the first terminal according to the registration request or the key obtaining request;
wherein allocation of the same encryption key for the first application and the first terminal comprises:
allocating for the first terminal the same encryption key as that of the first application when determining that the first terminal is only bound to the first application according to the binding relationship of the first terminal.

3. The encrypted communication method according to claim 2, wherein obtaining of the binding relationship of the first terminal further comprises at least one of the following:
obtaining an identifier of the first terminal from the registration request or from the key obtaining request, obtaining subscription configuration information according to the identifier of the first terminal, and determining the binding relationship of the first terminal according to the subscription configuration information of the first terminal; and
obtaining indication information from the registration request or the key obtaining request, and determining the binding relationship of the first terminal according to the indication information.

4. The encrypted communication method according to claim 3, wherein the allocation for the first terminal the same encryption key as that of the first application comprises:
obtaining the encryption key allocated for the first application when the encryption key is determined to be already been allocated for the first application; or
generating an encryption key;
storing the generated encryption key when the same encryption key is determined to not have been allocated for the first application; and
sending the same encryption key to the first terminal.

5. The encrypted communication method according to claim 1, further comprising:
receiving a registration request or a key obtaining request from the first application; and
obtaining a binding relationship of the first application according to the registration request or the key obtaining request.

6. The encrypted communication method according to claim 5, wherein the obtaining of the binding relationship of the first application comprises:
obtaining an identifier of the first application from the registration request or the key obtaining request, obtaining subscription configuration information of the first application according to the identifier of the first application, and determining the binding relationship of the first application according to the subscription configuration information of the first application; and
obtaining indication information from the registration request or the key obtaining request, and determining the binding relationship of the first application according to the indication information.

7. The encrypted communication method according to claim 5, wherein the allocation of the same encryption key for the first application and the first terminal comprises:
allocating the same encryption key as that of the first terminal that is only bound to the first application for the first application when the binding relationship of the first application indicates that the first terminal exists.

8. The encrypted communication method according to claim 7, wherein allocation for the first application the same encryption key as that of the first terminal comprises:
obtaining the encryption key allocated for the first terminal that is only bound to the first application when it is determined that the encryption key has already been allocated for the first terminal that is only bound to the first application;
generating an encryption key and storing the generated encryption key when it is determined that the encryption key has not been allocated for the first terminal that is only bound to the first application; and
sending the same encryption key to the first application.

9. The encrypted communication method according to claim 1, further comprising:
allocating an encryption key separately for a terminal that is bound to a plurality of applications or that is not bound to any application; and
allocating an encryption key separately for the first application when determining that there does not exist a terminal that is only bound to the first application.

10. The encrypted communication method according to claim 1, wherein receiving of the key updating request of the first terminal or triggering the updating setting rule of the first terminal, and obtaining the binding relationship of the first terminal comprises at least one of the following:
obtaining an identifier of the first terminal from the key updating request, obtaining subscription configuration information of the first terminal according to the identifier of the first terminal, and determining the binding relationship of the first terminal according to the subscription configuration information of the first terminal;
obtaining indication information from the key updating request, and determining the binding relationship of the first terminal according to the indication information; and
obtaining subscription configuration information of the first terminal when determining to trigger the updating setting rule of the first terminal, and determining the binding relationship of the first terminal according to the subscription configuration information of the first terminal.

11. The encrypted communication method according to claim 1, wherein the receiving of the key updating request of the first application or triggering updating setting rule, and obtaining the binding relationship of the first application comprises at least one of the following:

obtaining an identifier of the first application from the key updating request, obtaining subscription configuration information of the first application according to the identifier of the first application; and determining the binding relationship of the first application according to the subscription configuration information of the first application;

obtaining indication information from the key updating request; and determining the binding relationship of the first application according to the indication information; and obtaining the subscription configuration information of the first application when determining to trigger the updating setting rule of the first application; and determining the binding relationship of the first application according to the subscription configuration information of the first application.

12. An encrypted communication apparatus in a Machine to Machine (M2M) system, comprising:

a storage device, configured to store computer executable program codes for applying encrypted communication between a application and a terminal;

a transmitter, configured to send or receive information;

a processor, coupled with the storage device and the transmitter, configured to perform a process according to the computer executable program codes;

wherein the process comprises:

determining, a first terminal in the M2M system is only bound with a first application, wherein the first terminal only bound with the first application communicates with only the first application and does not communicate with other application than the first application;

allocating, based on the determination result of the first terminal only bound with the first application, a same encryption key for the first application and the first terminal;

transmitting, based on the determination result of which the first terminal is only bound with the first application, information encrypted by the first terminal using the same encryption key from the first terminal to the first application without performing decryption or re-encryption processing to the information; and transmitting, based on the determination result of which the first terminal is only bound with the first application, information encrypted by the first application using the same encryption key from the first application to the first terminal without performing decryption or re-encryption processing to the information;

wherein the processor is further configured to:

determine the performing of an updating corresponding to the first terminal upon receiving a key updating request of the first terminal or triggering an updating setting rule of the first terminal;

obtain a binding relationship of the first terminal when the processor determines the performing of the updating of the first terminal;

determine a terminal that is only bound to a first application and generate an encryption key corresponding to the determined terminal and the first application when determining that the first terminal is only bound to first application according to the binding relationship obtained by the processor, or generate an encryption key corresponding to the first terminal when determining that the first terminal is bound to a plurality of applications or is not bound to any application according to the binding relationship obtained by the processor;

send, through the transmitter, the encryption key generated by the processor to the first application and the first terminal that is only bound to the first application; or to send the encryption key generated by the processor to the first terminal; or the processor is further configured to:

determine the performing of the updating corresponding to a first application upon receiving the key updating request of the first application or triggering updating setting rule of the first application;

obtain a binding relationship of the first application when the processor determines the performing of the updating of the first application;

generate an encryption key corresponding to the first application and the first terminal that is only bound to the first application when determining that there exists the first terminal that is only bound to the first application according to the binding relationship obtained by the processor; or generate an encryption key corresponding to the first application when determining there does not exist a terminal that is only bound to the first application according to the binding relationship obtained by the processor;

send, through the transmitter, the encryption key generated by the processor to the first application and the first terminal that is only bound to the first application, or to send the encryption key generated by the processor to the first application.

13. The encrypted communication apparatus according to claim 12, wherein the processor is further configured to allocate an encryption key separately for a terminal that is bound to a plurality of applications or is not bound to any application, and allocate an encryption key separately for the first application when determining that there does not exist a terminal that is only bound to the first application.

14. The encrypted communication apparatus according to claim 13, wherein the processor is further configured to receive, through the transmitter, a registration request or a key obtaining request from the first terminal or sent by the first application;

obtain, according to the registration request or the key obtaining request received by the transmitter, a binding relationship of the first terminal or a binding relationship of the first application; or the processor is further configured to allocate for the first terminal the same encryption key as that of the first application when determining that the first terminal is only bound to the first application according to the binding relationship obtained by the processor; or allocate an encryption key separately for the first terminal when determining that the first terminal is bound to a plurality of applications or is not bound to any application according to the binding relationship obtained by the processor, or allocate for the first application the same encryption key as that of the first terminal that is only bound to the first application when determining that there exists a terminal that is only bound to the first application according to the binding relationship obtained by the processor; or, allocate an encryption key separately for the first application when determining that there does not exist a terminal that is only bound to the first application according to the binding relationship obtained by the processor.

15. The encrypted communication apparatus according to claim 14, wherein the processor is further configured to:

obtain an identifier of the first terminal from the registration request or the key obtaining request from the first terminal;

obtain subscription configuration information of the first terminal according the identifier obtained by the identifier obtaining module;

obtain the binding relationship of the first terminal according to the subscription configuration information obtained by the processor; or the processor is further configured to:

obtain an identifier of the first application from the registration request or the key obtaining request from the first application;

obtain subscription configuration information of the first application according to the identifier obtained by the processor; or obtain the binding relationship of the first application according to the subscription configuration information obtained by the processor.

16. The encrypted communication apparatus according to claim 14, wherein the processor is further configured to:

obtain indication information from the registration request or the key obtaining request from the first terminal;

obtain the binding relationship of the first terminal according the indication information obtained by the processor; or the processor is further configured to:

obtain indication information from the registration request or the key obtaining request from the first application;

obtain the binding relationship of the first application according to the indication information obtained by the processor.

17. The encrypted communication apparatus according to claim 14, wherein the processor is further configured to:

obtain the same encryption key allocated for the first application when determining that the first terminal is only bound to the first application according to the binding relationship of the first terminal and determining that an encryption key has already been allocated for the first application;

generate the encryption key corresponding to the first terminal when determining that the first terminal is only bound to the first application according to the binding relationship of terminal and an encryption key has not been allocated for the first application; or, generate an encryption key corresponding to the first terminal when determining that the first terminal is bound to a plurality of applications or is not bound to any application;

send, through the transmitter, the encryption key obtained by the processor or the encryption key generated by the processor to the first terminal; or the processor is further configured to:

obtain the same encryption key allocated for the first terminal that is only bound to the first application when determining that there exists the first terminal that is only bound to the first application according to the binding relationship of the first application and determining the encryption key has already been allocated for the first terminal that is only bound to the first application;

generate an encryption key corresponding to the first application when determining that there exists a terminal that is only bound to the first application according to the binding relationship of the first application, and determining that an encryption key has not been allocated for the first terminal that is only bound to the first application; or generate an encryption key corresponding to the first application when determining that there does not exist a terminal that is only bound to the first application according to the binding relationship of the first application;

send the encryption key obtained by the processor or the encryption key generated by the processor to the first application.

* * * * *